(12) United States Patent
Tankovich et al.

(10) Patent No.: US 9,348,912 B2
(45) Date of Patent: May 24, 2016

(54) DOCUMENT LENGTH AS A STATIC RELEVANCE FEATURE FOR RANKING SEARCH RESULTS

(75) Inventors: Vladimir Tankovich, Bellevue, WA (US); Dmitriy Meyerzon, Bellevue, WA (US); Michael James Taylor, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 700 days.

(21) Appl. No.: 12/207,910

(22) Filed: Sep. 10, 2008

(65) Prior Publication Data

US 2009/0106235 A1    Apr. 23, 2009

Related U.S. Application Data

(63) Continuation-in-part of application No. 11/874,579, filed on Oct. 18, 2007.

(51) Int. Cl.
*G06F 17/30* (2006.01)
*G06F 7/00* (2006.01)

(52) U.S. Cl.
CPC .............................. *G06F 17/30864* (2013.01)

(58) Field of Classification Search
CPC ............................................... G06F 17/30864
See application file for complete search history.

(56) References Cited

U.S. PATENT DOCUMENTS

| 5,222,236 A | 6/1993 | Potash |
| 5,257,577 A | 11/1993 | Clark |
| 5,321,833 A | 6/1994 | Chang et al. |
| 5,369,778 A | 11/1994 | San Soucie et al. |
| 5,544,360 A | 8/1996 | Lewak et al. |
| 5,594,660 A | 1/1997 | Sung et al. |
| 5,606,609 A | 2/1997 | Houser et al. |
| 5,634,124 A | 5/1997 | Khoyi et al. |
| 5,729,730 A | 3/1998 | Wlaschin et al. |
| 5,765,150 A | 6/1998 | Burrows |
| 5,826,269 A | 10/1998 | Hussey |
| 5,828,999 A * | 10/1998 | Bellegarda et al. ........... 704/240 |
| 5,848,404 A | 12/1998 | Hafner et al. |
| 5,870,739 A | 2/1999 | Davis, III et al. |
| 5,870,740 A | 2/1999 | Rose et al. |

(Continued)

FOREIGN PATENT DOCUMENTS

| CA | 2279119 | 1/2001 |
| CN | 101180624 A | 5/2008 |

(Continued)

OTHER PUBLICATIONS

Amit Singhal et al., Document Length Normalization, 1996, Cornell University, vol. 32, No. 5, pp. 619-633.*

(Continued)

*Primary Examiner* — Taelor Kim
(74) *Attorney, Agent, or Firm* — Julie Kane Akhter; Tom Wong; Micky Minhas

(57) ABSTRACT

Embodiments are configured to provide information based on a user query. In an embodiment, a system includes a search component having a ranking component that can be used to rank search results as part of a query response. In one embodiment, the ranking component includes a ranking algorithm that can use the length of documents returned in response to a search query to rank search results.

19 Claims, 4 Drawing Sheets

(56) References Cited

U.S. PATENT DOCUMENTS

| | | | |
|---|---|---|---|
| 5,890,147 | A | 3/1999 | Peltonen et al. |
| 5,893,092 | A | 4/1999 | Driscoll |
| 5,893,116 | A | 4/1999 | Simmonds et al. |
| 5,905,866 | A | 5/1999 | Nakabayashi et al. |
| 5,913,210 | A | 6/1999 | Call |
| 5,920,859 | A | 7/1999 | Li |
| 5,933,822 | A | 8/1999 | Braden-Harder et al. |
| 5,933,851 | A | 8/1999 | Kojima et al. |
| 5,943,670 | A | 8/1999 | Prager |
| 5,956,722 | A | 9/1999 | Jacobson et al. |
| 5,960,383 | A | 9/1999 | Fleischer |
| 5,983,216 | A | 11/1999 | Kirsch et al. |
| 5,987,457 | A | 11/1999 | Ballard |
| 6,006,225 | A | 12/1999 | Bowman et al. |
| 6,012,053 | A | 1/2000 | Pant et al. |
| 6,026,398 | A | 2/2000 | Brown et al. |
| 6,029,164 | A | 2/2000 | Birrell et al. |
| 6,032,196 | A | 2/2000 | Monier |
| 6,038,610 | A | 3/2000 | Belfiore et al. |
| 6,041,323 | A * | 3/2000 | Kubota ................. 1/1 |
| 6,070,158 | A | 5/2000 | Kirsch et al. |
| 6,070,191 | A | 5/2000 | Narendran et al. |
| 6,098,064 | A | 8/2000 | Pirolli et al. |
| 6,115,709 | A | 9/2000 | Gilmour et al. |
| 6,125,361 | A | 9/2000 | Chakrabarti et al. |
| 6,128,701 | A | 10/2000 | Malcolm et al. |
| 6,145,003 | A | 11/2000 | Sanu et al. |
| 6,151,624 | A | 11/2000 | Teare et al. |
| 6,167,369 | A | 12/2000 | Schulze |
| 6,167,402 | A | 12/2000 | Yeager |
| 6,178,419 | B1 | 1/2001 | Legh-Smith et al. |
| 6,182,065 | B1 | 1/2001 | Yeomans |
| 6,182,067 | B1 | 1/2001 | Presnell et al. |
| 6,182,085 | B1 | 1/2001 | Eichstaedt et al. |
| 6,182,113 | B1 | 1/2001 | Narayanaswami |
| 6,185,558 | B1 | 2/2001 | Bowman et al. |
| 6,199,081 | B1 | 3/2001 | Meyerzon et al. |
| 6,202,058 | B1 | 3/2001 | Rose et al. |
| 6,208,988 | B1 | 3/2001 | Schultz |
| 6,216,123 | B1 | 4/2001 | Robertson |
| 6,222,559 | B1 | 4/2001 | Asano et al. |
| 6,240,408 | B1 | 5/2001 | Kaufman |
| 6,247,013 | B1 | 6/2001 | Morimoto |
| 6,263,364 | B1 | 7/2001 | Najork et al. |
| 6,269,370 | B1 | 7/2001 | Kirsch |
| 6,272,507 | B1 | 8/2001 | Pirolli et al. |
| 6,285,367 | B1 | 9/2001 | Abrams et al. |
| 6,285,999 | B1 * | 9/2001 | Page ................. 1/1 |
| 6,304,864 | B1 | 10/2001 | Liddy et al. |
| 6,314,421 | B1 | 11/2001 | Sharnoff et al. |
| 6,317,741 | B1 | 11/2001 | Burrows |
| 6,324,551 | B1 | 11/2001 | Lamping et al. |
| 6,326,962 | B1 | 12/2001 | Szabo |
| 6,327,590 | B1 | 12/2001 | Chidlovskii ................. 707/5 |
| 6,336,117 | B1 | 1/2002 | Massarani et al. |
| 6,349,308 | B1 | 2/2002 | Whang et al. |
| 6,351,467 | B1 | 2/2002 | Dillon |
| 6,351,755 | B1 | 2/2002 | Najork et al. |
| 6,360,215 | B1 | 3/2002 | Judd et al. |
| 6,381,597 | B1 | 4/2002 | Lin |
| 6,385,602 | B1 | 5/2002 | Tso et al. |
| 6,389,436 | B1 | 5/2002 | Chakrabarti et al. |
| 6,415,319 | B1 | 7/2002 | Ambroziak |
| 6,418,433 | B1 | 7/2002 | Chakrabarti et al. |
| 6,418,452 | B1 | 7/2002 | Kraft et al. |
| 6,418,453 | B1 | 7/2002 | Kraft et al. |
| 6,424,966 | B1 | 7/2002 | Meyerzon et al. |
| 6,442,606 | B1 | 8/2002 | Subbaroyan et al. |
| 6,473,752 | B1 | 10/2002 | Fleming |
| 6,484,204 | B1 | 11/2002 | Rabinovich |
| 6,516,312 | B1 | 2/2003 | Kraft et al. |
| 6,526,440 | B1 | 2/2003 | Bharat |
| 6,539,376 | B1 | 3/2003 | Sundaresan et al. |
| 6,546,388 | B1 | 4/2003 | Edlund et al. |
| 6,547,829 | B1 | 4/2003 | Meyerzon et al. |
| 6,549,896 | B1 | 4/2003 | Candan |
| 6,549,897 | B1 | 4/2003 | Katariya et al. |
| 6,553,364 | B1 | 4/2003 | Wu |
| 6,557,036 | B1 | 4/2003 | Kavacheri et al. |
| 6,560,600 | B1 | 5/2003 | Broder |
| 6,594,682 | B2 | 7/2003 | Peterson et al. |
| 6,598,040 | B1 | 7/2003 | Cragun et al. |
| 6,598,047 | B1 | 7/2003 | Russell et al. |
| 6,598,051 | B1 | 7/2003 | Wiener et al. |
| 6,601,075 | B1 | 7/2003 | Huang et al. |
| 6,622,140 | B1 | 9/2003 | Kantrowitz |
| 6,628,304 | B2 | 9/2003 | Mitchell et al. |
| 6,631,369 | B1 | 10/2003 | Meyerzon et al. |
| 6,633,867 | B1 | 10/2003 | Kraft et al. |
| 6,633,868 | B1 | 10/2003 | Min ................. 707/3 |
| 6,636,853 | B1 | 10/2003 | Stephens |
| 6,638,314 | B1 | 10/2003 | Meyerzon et al. |
| 6,654,742 | B1 | 11/2003 | Kobayashi et al. |
| 6,671,683 | B2 | 12/2003 | Kanno ................. 707/5 |
| 6,678,692 | B1 | 1/2004 | Hyatt |
| 6,701,318 | B2 | 3/2004 | Fox et al. |
| 6,718,324 | B2 | 4/2004 | Edlund et al. |
| 6,718,365 | B1 | 4/2004 | Dutta |
| 6,725,259 | B1 | 4/2004 | Bharat |
| 6,738,764 | B2 | 5/2004 | Mao et al. |
| 6,763,362 | B2 | 7/2004 | McKeeth |
| 6,766,316 | B2 | 7/2004 | Caudill et al. |
| 6,766,422 | B2 | 7/2004 | Beyda |
| 6,772,141 | B1 | 8/2004 | Pratt et al. |
| 6,775,659 | B2 | 8/2004 | Clifton-Bligh |
| 6,775,664 | B2 | 8/2004 | Lang et al. |
| 6,778,997 | B2 | 8/2004 | Sundaresan |
| 6,829,606 | B2 | 12/2004 | Ripley |
| 6,859,800 | B1 | 2/2005 | Roche et al. |
| 6,862,710 | B1 | 3/2005 | Marchisio |
| 6,868,411 | B2 | 3/2005 | Shanahan |
| 6,871,202 | B2 | 3/2005 | Broder |
| 6,873,982 | B1 | 3/2005 | Bates et al. |
| 6,883,135 | B1 | 4/2005 | Obata et al. |
| 6,886,010 | B2 | 4/2005 | Kostoff |
| 6,886,129 | B1 | 4/2005 | Raghavan et al. |
| 6,898,592 | B2 | 5/2005 | Peltonen et al. |
| 6,910,029 | B1 | 6/2005 | Sundaresan |
| 6,931,397 | B1 | 8/2005 | Sundaresan |
| 6,934,714 | B2 | 8/2005 | Meinig |
| 6,944,609 | B2 | 9/2005 | Witbrock |
| 6,947,930 | B2 | 9/2005 | Anick et al. |
| 6,959,326 | B1 | 10/2005 | Day et al. |
| 6,973,490 | B1 | 12/2005 | Robertson et al. |
| 6,990,628 | B1 | 1/2006 | Palmer et al. |
| 6,999,959 | B1 | 2/2006 | Lawrence et al. |
| 7,003,442 | B1 | 2/2006 | Tsuda |
| 7,010,532 | B1 | 3/2006 | Stakutis et al. |
| 7,016,540 | B1 | 3/2006 | Gong et al. |
| 7,028,029 | B2 | 4/2006 | Kamvar et al. |
| 7,039,234 | B2 | 5/2006 | Geidl |
| 7,051,023 | B2 | 5/2006 | Kapur et al. |
| 7,065,523 | B2 | 6/2006 | Peltonen et al. |
| 7,072,888 | B1 | 7/2006 | Perkins |
| 7,076,483 | B2 | 7/2006 | Preda et al. |
| 7,080,073 | B1 | 7/2006 | Jiang et al. |
| 7,085,755 | B2 | 8/2006 | Bluhm et al. |
| 7,107,218 | B1 | 9/2006 | Preston |
| 7,133,870 | B1 | 11/2006 | Tripp et al. |
| 7,152,059 | B2 | 12/2006 | Monteverde |
| 7,181,438 | B1 | 2/2007 | Szabo |
| 7,197,497 | B2 | 3/2007 | Cossock ................. 707/7 |
| 7,228,301 | B2 | 6/2007 | Meyerzon et al. |
| 7,231,399 | B1 | 6/2007 | Bem |
| 7,243,102 | B1 | 7/2007 | Naam et al. |
| 7,246,128 | B2 | 7/2007 | Jordahl |
| 7,257,574 | B2 | 8/2007 | Parikh |
| 7,257,577 | B2 | 8/2007 | Fagin et al. |
| 7,260,573 | B1 | 8/2007 | Jeh |
| 7,278,105 | B1 | 10/2007 | Kitts |
| 7,281,002 | B2 | 10/2007 | Farrell |
| 7,283,997 | B1 | 10/2007 | Howard et al. |
| 7,308,643 | B1 | 12/2007 | Zhu |
| 7,328,401 | B2 | 2/2008 | Obata et al. |

(56) References Cited

U.S. PATENT DOCUMENTS

| | | | |
|---|---|---|---|
| 7,346,604 B1 | 3/2008 | Bharat | |
| 7,346,839 B2 | 3/2008 | Acharya | |
| 7,356,530 B2 | 4/2008 | Kim et al. | |
| 7,386,527 B2 | 6/2008 | Harris | |
| 7,415,459 B2 | 8/2008 | Peltonen et al. | |
| 7,428,530 B2 | 9/2008 | Ramarathnam et al. | |
| 7,496,561 B2 | 2/2009 | Caudill | |
| 7,499,919 B2 | 3/2009 | Meyerzon et al. | |
| 7,519,529 B1 | 4/2009 | Horvitz | |
| 7,562,068 B2 | 7/2009 | Naam | |
| 7,580,568 B1 | 8/2009 | Wang | |
| 7,606,793 B2 | 10/2009 | Merrigan et al. | |
| 7,644,107 B2 | 1/2010 | Neagovici-Negoescu et al. | |
| 7,685,084 B2 | 3/2010 | Sisk | |
| 7,689,531 B1 | 3/2010 | Diao | |
| 7,689,559 B2 | 3/2010 | Canright et al. | |
| 7,693,829 B1 | 4/2010 | Alshawi | |
| 7,716,225 B1 | 5/2010 | Dean | |
| 7,716,226 B2 | 5/2010 | Barney | |
| 7,720,830 B2 * | 5/2010 | Wen et al. | 707/705 |
| 7,827,181 B2 | 11/2010 | Petriuc | |
| 7,836,048 B2 | 11/2010 | Schneider | |
| 7,836,391 B2 | 11/2010 | Tong | |
| 7,840,569 B2 | 11/2010 | Meyerzon et al. | |
| 7,844,589 B2 | 11/2010 | Wang et al. | |
| 7,962,462 B1 | 6/2011 | Lamping et al. | |
| 8,082,246 B2 | 12/2011 | Meyerzon et al. | |
| 8,126,883 B2 | 2/2012 | Qiu | |
| 8,165,406 B2 | 4/2012 | Tan et al. | |
| 8,326,829 B2 | 12/2012 | Gupta | |
| 8,370,331 B2 | 2/2013 | Pontier et al. | |
| 8,412,702 B2 | 4/2013 | Cozzi | |
| 8,412,717 B2 | 4/2013 | Liao et al. | |
| 8,843,486 B2 | 9/2014 | Merrigan et al. | |
| 8,909,655 B1 | 12/2014 | McDonnell | |
| 2001/0042076 A1 | 11/2001 | Fukuda | |
| 2002/0016787 A1 * | 2/2002 | Kanno | 707/5 |
| 2002/0026390 A1 | 2/2002 | Ulenas et al. | |
| 2002/0032772 A1 | 3/2002 | Olstad et al. | |
| 2002/0055940 A1 | 5/2002 | Elkan | 707/104.1 |
| 2002/0062323 A1 | 5/2002 | Takatori et al. | |
| 2002/0078045 A1 | 6/2002 | Dutta | |
| 2002/0083054 A1 | 6/2002 | Peltonen et al. | |
| 2002/0099694 A1 | 7/2002 | Diamond et al. | |
| 2002/0103798 A1 | 8/2002 | Abrol et al. | |
| 2002/0107861 A1 | 8/2002 | Clendinning et al. | |
| 2002/0107886 A1 | 8/2002 | Gentner et al. | |
| 2002/0123988 A1 | 9/2002 | Dean et al. | |
| 2002/0129014 A1 | 9/2002 | Kim et al. | |
| 2002/0129015 A1 | 9/2002 | Caudill et al. | |
| 2002/0165873 A1 * | 11/2002 | Kwok et al. | 707/500 |
| 2002/0168106 A1 | 11/2002 | Trajkovic | |
| 2002/0169595 A1 | 11/2002 | Agichtein et al. | |
| 2002/0169754 A1 | 11/2002 | Mao et al. | |
| 2002/0169770 A1 | 11/2002 | Kim et al. | |
| 2002/0169800 A1 | 11/2002 | Sundaresan et al. | |
| 2003/0004952 A1 | 1/2003 | Nixon et al. | |
| 2003/0028520 A1 | 2/2003 | Alpha | |
| 2003/0037074 A1 | 2/2003 | Dwork et al. | |
| 2003/0046389 A1 | 3/2003 | Thieme | |
| 2003/0053084 A1 | 3/2003 | Geidl | |
| 2003/0055810 A1 | 3/2003 | Cragun | |
| 2003/0061201 A1 | 3/2003 | Grefenstette et al. | |
| 2003/0065706 A1 | 4/2003 | Smyth et al. | |
| 2003/0074368 A1 | 4/2003 | Schuetze et al. | |
| 2003/0088545 A1 | 5/2003 | Subramaniam | |
| 2003/0101183 A1 | 5/2003 | Kabra et al. | |
| 2003/0135490 A1 | 7/2003 | Barrett | |
| 2003/0195882 A1 | 10/2003 | Lee et al. | |
| 2003/0208482 A1 | 11/2003 | Kim et al. | |
| 2003/0217007 A1 | 11/2003 | Fukushima | |
| 2003/0217047 A1 | 11/2003 | Marchisio | |
| 2003/0217052 A1 | 11/2003 | Rubenczyk et al. | |
| 2004/0003028 A1 | 1/2004 | Emmett | |
| 2004/0006559 A1 | 1/2004 | Gange et al. | |
| 2004/0024752 A1 | 2/2004 | Manber et al. | |
| 2004/0049766 A1 | 3/2004 | Bloch et al. | |
| 2004/0064442 A1 | 4/2004 | Popovitch | |
| 2004/0093328 A1 | 5/2004 | Damle | |
| 2004/0111408 A1 | 6/2004 | Caudill | |
| 2004/0117351 A1 | 6/2004 | Challapalli et al. | |
| 2004/0141354 A1 | 7/2004 | Carnahan | |
| 2004/0148278 A1 | 7/2004 | Milo et al. | |
| 2004/0181515 A1 | 9/2004 | Ullmann et al. | |
| 2004/0186827 A1 | 9/2004 | Anick et al. | |
| 2004/0194099 A1 | 9/2004 | Lamping et al. | |
| 2004/0199497 A1 | 10/2004 | Timmons | |
| 2004/0205497 A1 | 10/2004 | Alexander | |
| 2004/0215664 A1 | 10/2004 | Hennings et al. | |
| 2004/0249795 A1 | 12/2004 | Brockway et al. | |
| 2004/0254932 A1 | 12/2004 | Gupta et al. | |
| 2004/0260695 A1 | 12/2004 | Brill | |
| 2004/0267722 A1 | 12/2004 | Larimore et al. | |
| 2005/0033742 A1 | 2/2005 | Kamvar et al. | |
| 2005/0044071 A1 | 2/2005 | Cho et al. | |
| 2005/0055340 A1 | 3/2005 | Dresden | |
| 2005/0055347 A9 | 3/2005 | Cho et al. | |
| 2005/0060186 A1 | 3/2005 | Blowers | |
| 2005/0060304 A1 | 3/2005 | Parikh | |
| 2005/0060310 A1 | 3/2005 | Tong | |
| 2005/0060311 A1 | 3/2005 | Tong et al. | |
| 2005/0071328 A1 | 3/2005 | Lawrence | |
| 2005/0071741 A1 | 3/2005 | Acharya et al. | |
| 2005/0086192 A1 | 4/2005 | Kodama | |
| 2005/0086206 A1 | 4/2005 | Balasubramanian et al. | |
| 2005/0086583 A1 | 4/2005 | Obata et al. | |
| 2005/0089215 A1 | 4/2005 | Staelin | |
| 2005/0114324 A1 | 5/2005 | Mayer | |
| 2005/0125392 A1 | 6/2005 | Curtis et al. | |
| 2005/0144162 A1 | 6/2005 | Liang | |
| 2005/0154710 A1 | 7/2005 | Ruhlow et al. | |
| 2005/0154746 A1 | 7/2005 | Liu et al. | |
| 2005/0165718 A1 | 7/2005 | Fontoura et al. | |
| 2005/0165753 A1 | 7/2005 | Chen et al. | |
| 2005/0165781 A1 | 7/2005 | Kraft et al. | |
| 2005/0187965 A1 | 8/2005 | Abajian | |
| 2005/0192936 A1 | 9/2005 | Meek et al. | |
| 2005/0192955 A1 | 9/2005 | Farrell | |
| 2005/0210006 A1 | 9/2005 | Robertson | 707/3 |
| 2005/0210079 A1 | 9/2005 | Edlund et al. | |
| 2005/0210105 A1 | 9/2005 | Hirata et al. | |
| 2005/0216533 A1 | 9/2005 | Berkhin | |
| 2005/0240580 A1 | 10/2005 | Zamir et al. | |
| 2005/0251499 A1 | 11/2005 | Huang | 707/1 |
| 2005/0256865 A1 | 11/2005 | Ma et al. | |
| 2005/0262050 A1 | 11/2005 | Fagin et al. | |
| 2005/0283473 A1 | 12/2005 | Rousso | |
| 2005/0289133 A1 | 12/2005 | Arrouye et al. | |
| 2005/0289193 A1 | 12/2005 | Arrouye et al. | |
| 2006/0004732 A1 | 1/2006 | Odom | |
| 2006/0031183 A1 | 2/2006 | Oral et al. | |
| 2006/0036598 A1 | 2/2006 | Wu | |
| 2006/0041521 A1 | 2/2006 | Oral et al. | |
| 2006/0047643 A1 | 3/2006 | Chaman | |
| 2006/0047649 A1 | 3/2006 | Liang | |
| 2006/0059144 A1 | 3/2006 | Canright et al. | |
| 2006/0064411 A1 | 3/2006 | Gross et al. | |
| 2006/0069982 A1 | 3/2006 | Petriuc | |
| 2006/0074871 A1 | 4/2006 | Meyerzon et al. | |
| 2006/0074883 A1 | 4/2006 | Teevan et al. | |
| 2006/0074903 A1 | 4/2006 | Meyerzon et al. | |
| 2006/0095416 A1 | 5/2006 | Barkhin et al. | |
| 2006/0136411 A1 * | 6/2006 | Meyerzon et al. | 707/5 |
| 2006/0149723 A1 | 7/2006 | Finger, II | |
| 2006/0161534 A1 | 7/2006 | Carson, Jr. | |
| 2006/0173560 A1 | 8/2006 | Widrow | |
| 2006/0173828 A1 | 8/2006 | Rosenberg | |
| 2006/0195440 A1 | 8/2006 | Burges et al. | |
| 2006/0200460 A1 | 9/2006 | Meyerzon et al. | |
| 2006/0206460 A1 | 9/2006 | Gadkari et al. | |
| 2006/0206476 A1 | 9/2006 | Kapur et al. | |
| 2006/0212423 A1 * | 9/2006 | Jones et al. | 707/2 |
| 2006/0224554 A1 | 10/2006 | Bailey et al. | |
| 2006/0248074 A1 | 11/2006 | Carmel et al. | |

(56) References Cited

U.S. PATENT DOCUMENTS

| | | |
|---|---|---|
| 2006/0259481 A1 | 11/2006 | Handley |
| 2006/0282306 A1 | 12/2006 | Thissen-Roe |
| 2006/0282455 A1 | 12/2006 | Lee et al. |
| 2006/0287993 A1 | 12/2006 | Yao et al. |
| 2006/0294100 A1 | 12/2006 | Meyerzon et al. |
| 2007/0038616 A1 | 2/2007 | Guha |
| 2007/0038622 A1 | 2/2007 | Meyerzon et al. |
| 2007/0050338 A1 | 3/2007 | Strohm et al. |
| 2007/0067284 A1 | 3/2007 | Meyerzon et al. |
| 2007/0073748 A1 | 3/2007 | Barney |
| 2007/0085716 A1 | 4/2007 | Bar-Yossef et al. |
| 2007/0094285 A1 | 4/2007 | Agichtein et al. |
| 2007/0106659 A1 | 5/2007 | Lu et al. |
| 2007/0150473 A1 | 6/2007 | Li et al. |
| 2007/0198459 A1 | 8/2007 | Boone |
| 2007/0260597 A1 | 11/2007 | Cramer |
| 2007/0276829 A1 | 11/2007 | Wang |
| 2008/0005068 A1 | 1/2008 | Dumais et al. |
| 2008/0016053 A1 | 1/2008 | Frieden et al. |
| 2008/0140641 A1 | 6/2008 | Wang |
| 2008/0154888 A1 | 6/2008 | Buron et al. |
| 2008/0195596 A1 | 8/2008 | Sisk |
| 2009/0006356 A1 | 1/2009 | Liao et al. |
| 2009/0006358 A1 | 1/2009 | Morris et al. |
| 2009/0024606 A1 | 1/2009 | Schilit et al. |
| 2009/0070306 A1 | 3/2009 | Stroe et al. |
| 2009/0106235 A1 | 4/2009 | Tankovich et al. |
| 2009/0157607 A1 | 6/2009 | Tiyyagura |
| 2009/0164929 A1 | 6/2009 | Chen et al. |
| 2009/0240680 A1* | 9/2009 | Tankovich et al. ............... 707/5 |
| 2009/0259651 A1 | 10/2009 | Tankovich et al. |
| 2009/0276421 A1 | 11/2009 | Qiu |
| 2009/0307209 A1 | 12/2009 | Carmel et al. |
| 2010/0191744 A1 | 7/2010 | Meyerzon et al. |
| 2010/0268707 A1 | 10/2010 | Meyerzon et al. |
| 2011/0106850 A1 | 5/2011 | Li et al. |
| 2011/0137893 A1 | 6/2011 | Shnitko et al. |
| 2011/0235909 A1 | 9/2011 | Chenthamarakshan et al. |
| 2011/0295850 A1 | 12/2011 | Tankovich et al. |
| 2013/0198174 A1 | 8/2013 | Poznanski et al. |

FOREIGN PATENT DOCUMENTS

| | | |
|---|---|---|
| CN | 1010000608 A | 1/2009 |
| CN | 101360074 A | 2/2009 |
| DE | 10029644 A1 | 1/2002 |
| EP | 0950961 | 10/1999 |
| EP | 1050830 | 11/2000 |
| EP | 1120717 | 8/2001 |
| EP | 1282060 A2 | 2/2003 |
| EP | 1462950 | 9/2004 |
| EP | 1557770 A1 | 7/2005 |
| EP | 1862916 | 12/2007 |
| ID | P0027547 | 2/2011 |
| JP | 62-297909 | 12/1897 |
| JP | Hei 4-274533 | 9/1992 |
| JP | Hei 04-281565 | 10/1992 |
| JP | 2009-204442 | 8/1997 |
| JP | 2009-305622 | 11/1997 |
| JP | 10091638 | 4/1998 |
| JP | Hei 10-124524 | 5/1998 |
| JP | 10-240757 | 9/1998 |
| JP | Hei 11-45243 | 2/1999 |
| JP | H11-232300 A | 8/1999 |
| JP | 11328191 | 11/1999 |
| JP | 2000-194713 | 7/2000 |
| JP | 2001-052017 | 2/2001 |
| JP | 2001-117934 | 4/2001 |
| JP | 2001-265774 | 9/2001 |
| JP | 2002-024015 | 1/2002 |
| JP | 2002-091843 | 3/2002 |
| JP | 2002-132769 | 5/2002 |
| JP | 2002-140365 | 5/2002 |
| JP | 2002-157271 | 5/2002 |
| JP | 2002-202992 | 7/2002 |
| JP | 2002-245089 | 8/2002 |
| JP | 2002-366549 | 12/2002 |
| JP | 2003-67419 | 3/2003 |
| JP | 2003-076715 | 3/2003 |
| JP | 2003-208434 | 7/2003 |
| JP | 2003-248696 | 9/2003 |
| JP | 2004-21589 | 1/2004 |
| JP | 2004-54588 | 2/2004 |
| JP | 2004-164555 | 6/2004 |
| JP | 2004-192657 | 7/2004 |
| JP | 2004-192657 | 8/2004 |
| JP | 2004-265015 | 9/2004 |
| JP | 2008-146424 | 12/2006 |
| JP | 2007-507798 | 3/2007 |
| JP | 2008-033931 | 2/2008 |
| JP | 2009-252179 | 4/2008 |
| JP | 2009-509275 | 3/2009 |
| JP | 2009-146248 | 7/2009 |
| JP | 4950444 | 3/2012 |
| KR | 10-2002-0015838 | 3/2002 |
| KR | 10-2003-0082109 | 10/2003 |
| KR | 20030080826 | 10/2003 |
| KR | 1020060048716 A | 5/2006 |
| KR | 10-2006-0116042 | 11/2006 |
| KR | 10-2008-0017685 A | 2/2008 |
| KR | 10-2008-0024584 | 3/2008 |
| RU | 2 138 076 C1 | 9/1999 |
| RU | 2001128643 | 7/2003 |
| RU | 2236699 | 9/2004 |
| RU | 2273879 C2 | 4/2006 |
| RU | 2319202 C2 | 3/2008 |
| TW | 530224 | 5/2003 |
| TW | 575813 | 2/2004 |
| TW | I227976 | 2/2005 |
| TW | I284818 | 8/2007 |
| WO | WO 02/42862 | 5/2002 |
| WO | WO 03/009180 | 1/2003 |
| WO | WO 2006/121269 | 11/2006 |
| WO | WO 2007/089289 | 8/2007 |
| WO | WO 2007/123416 | 11/2007 |
| WO | WO 2007149623 | 12/2007 |
| WO | WO 2009/072174 | 6/2009 |
| WO | WO 2010031085 | 3/2010 |
| ZA | 2011/00293 | 4/2012 |

OTHER PUBLICATIONS

K. L. Kwok, A Network Approach to Probabilistic Information Retrieval, Jul. 1995, ACM Transactions on Information Systems, vol. 13, No. 3, pp. 324-353.*

Okapi Similarity Measurement (Okapi), 2002, 11th International Web Conference, www2002, p. 1.*

Jien Yun Nie, Introduction to information retrieval, 1989, University of Montreal Canada, pp. 1-11.*

Robertson, S, Okapi at TREC-3, 1995, centre for interactive Systems Research Department of Information Science, Third Text Retrieval Conference, pp. 1-385.*

Agichten et al., "Improving Web Search Ranking by Incorporating User Behavior Information"—http://www.mathcs.emory.edu/~eugene/papers/sigir2006ranking.pdf, 8 pp.

Bandinelli, Luca, "Using Microsoft SharePoint Products and Technologies in Multilingual Scenarios", http://www.microsoft.com/technet/prodtechnol/office/sps2003/maintain/spmultil.mspx, published on Nov. 1, 2003, printed on May 22, 2006, 32 pp.

Brin, S. et al., "The Anatomy of a Large-Scale Hypertextual Web Search Engine", Proceedings of the Seventh International World-Wide Web Conference, 'Online! Apr. 14, 1998, pp. 1-26.

Carmel, D. et al., "Searching XML Documents Via XML Fragments", SIGIR Toronto, Canada, Jul.-Aug. 2003, pp. 151-158.

Chakrabarti, S., "Recent Results in Automatic Web Resource Discovery", ACM Computing Surveys, vol. 31, No. 4es, Dec. 1999, pp. 1-7.

Cho et al., "Efficient Crawling Through URL Ordering", In Proceedings of the 7th International World Wide Web Conference, Apr. 1998, pp. 161-180.

(56) References Cited

OTHER PUBLICATIONS

Craswell, N. et al., "TREC12 Web Track as CSIRO", TREC 12, Nov. 2003, 11 pp.
Cutler, M. et al., "A New Study on Using HTML Structures to Improve Retrieval", 11th IEEE International Conference on Chicago, IL, Nov. 9-11, 1999, pp. 406-409.
Eiron, N. et al., "Analysis of Anchor Text for Web Search", Proceedings of the 26th Annual International ACM SIGIR Conference on Research and Development in Information Retrieval, Jul. 28-Aug. 1, 2003, Toronto, Canada, 8 pgs.
Fagin, R. et al., "Searching the Workplace Web", IBM Almaden Research Center, In Proceedings of the Twelfth International World Wide Web Conference, Budapest, 2003, 21 pgs.
Fagin, Ronald, "Searching the Workplace Web", Mar. 3, 2005, pp. 1-10.
Hawking, D. et al., "Overview of the TREC-8 Web Track", TREC, Feb. 2000, pp. 1-18.
Hawking, D., "Overview of the TREC-9 Track", TREC, 2000, pp. 1-16.
Hawking., D. et al., "Overview of TREC-7 Very Large Collection Track", TREC, Jan. 1999, pp. 1-13.
Heery, Rachel, "Review of Metadata Formats", Program, vol. 30, No. 4, Oct. 1996, 1996 IEEE, pp. 345-373.
Hiemstra, D. et al., "Relevance Feedback for Best Match Term Weighting Algorithms in Information Retrieval", Proceedings of the Joint DELOS-NSF Workshop on Personalisation and Recommender Systems in Digital Libraries, ERCIM Workshop Proceedings 01/W03, pp. 37-42, Jun. 2001.
Huang et al., "Design and Implementation of a Chinese Full-Text Retrieval System Based on Probabilistic Model", IEEE, 1993, pp. 1090-1093.
Jones, K. et al., "A probabilistic model of information retrieval: development and status", Department of Information Science, City University, London, Aug. 1998, 74 pgs.
Kotsakis, E., "Structured Information Retrieval in XML Documents", Proceedings of the ACM Symposium on Applied Computing, Madrid, Spain, 2002, pp. 663-667.
Kucuk, Mehmet Emin, et al., "Application of Metadata Concepts to Discovery of Internet Resources", ADVIS 2000, INCS 1909, pp. 304-313, 2000.
Lalmas, M., "Uniform Representation of Content and Structure for Structured Document Retrieval", $20^{th}$ SGES International Conference on Knowledge Based Systems and Applied Artificial Intelligence, Cambridge, UK, Dec. 2000, pp. 1-12.
Lam et al., "Automatic Document Classification Based on Probabilistic Reasoning: Model and Performance Analysis", IEEE, 1997, pp. 2719-2723.
Larkey, Leah S., et al., "Collection Selection and Results Merging with Topically Organized U.S. Patents and TREC Data", Proceedings of the Ninth International Conference on Information Knowledge Management, CIKM 2000, Nov. 6-11, 2000, pp. 282-289.
Lee, J.K.W. et al., "Intelligent Agents for Matching Information Providers and Consumers on the World-Wide Web", IEEE, 1997, pp. 189-199.
Losee, R. et al., "Research in Information Organization", Literature Review, School of Information and Library Science, Section 4, pp. 53-96, Jan. 2001.
Manning, C. et al., "CS276A Text Information Retrieval, Mining, and Exploitation: Lecture 12", Stanford University CS276A/SYMBSYS2391/LING2391 Test Information Retrieval, Mining, and Exploitation, Fall 2002, last modified Nov. 18, 2002, 8 pgs.
Matveeva, Irina, et al., "High Accuracy Retrieval with Multiple Nested Ranker," http://people.cs.uchicago.edu/~matveeva/RankerSIGIR06.pdf, SIGIR'06, Seattle, WA Aug. 6-11, 2006, 8 pages.
"Microsoft External Content in Microsoft Office SharePoint Portal Server 2003", http://www.microsoft.com/technet/prodtechnol/sppt/reskit/c2261881x.mspx, published on Jun. 9, 2004, printed on May 22, 2006, 20 pp.
"Microsoft Full-Text Search Technologies", http://www.microsoft.com/technet/prodtechnol/sppt/sharepoint/evaluate/featfunc/mssearc . . . , published on Jun. 1, 2001, printed on May 22, 2006, 13 pp.
"Microsoft SharePoint Portal Server 2001 Resource Kit: Chapter 24, Analyzing the Default Query for the Dashboard", http://www.microsoft.com/technet/prodtechnol/sppt/sharepoint/reskit/part5/c24spprk.mspx, printed on May 22, 2006, 5 pp.
Najork, Marc et al., "Breadth-First Crawling Yields High-Quality Pages", ACM, Compaq Systems Research Center, Hong Kong, 2001, pp. 114-118.
Nelson, Chris, "Use of Metadata Registries for Searching for Statistical Data", IEEE 2002, Dimension EDI Ltd., pp. 232-235, 2002.
Numerico, T., "Search engines organization of information and Web Topology", http://www.cafm.lsbu.ac.uk/eminars/sse/numerico-6-dec-2004.pdf, Dec. 6, 2004, 32 pgs.
Ogilvie, P. et al., "Combining Document Representations for Known-Item Search", Proceedings of the $26^{th}$ Annual International ACM SIGIR Conference on Research and Development in Information Retrieval, Toronto, Canada, 2003, pp. 143-150.
"Planning Your Information Structure Using Microsoft Office SharePoint Portal Server 2003", http://www.microsoft.com/technet/prodtechnol/sppt/reskit/c0861881x.mspx, published on Jun. 9, 2004, printed on May 22, 2006, 22 pp.
Radlinski, Filip, et al.,, "Query Chains: Learning to Rank from Implicit Feedback,"http://delivery.acm.org/10.1145/1090000/1081899/p239-radlinski.pdf?key1=1081899&key2=3628533811&coll=GUIDE& CFID=27212902&CFTOKEN=53118399, KDD'05, Chicago, IL, Aug. 21-24, 2005,10 pages.
Robertson, S. et al., "Okapi at TREC-4", 1996, 24 pp.
Robertson, S. et al., "Some Simple Effective Approximations to the 2-Poisson Model for Probabilistic Weighted Retrieval", Proceedings of the $17^{th}$ Annual International ACM SIGIR Conference on Research and Development in Information Retrieval, 1994, pp. 232-241.
Schulz, Stefan, et al., "Indexing Medical WWW Documents by Morphemes", MEDINFO 2001 Proceedings of the $10^{th}$ World Congress on Medical Informatics, Park I, IOS Press, Inc., pp. 266-270, 2001.
Senecal, Sylvain, "Consumers' Decision-Making Process and Their Online Shopping Behavior: A Clickstream Analysis", Jun. 1, 2004, pp. 1600-1607.
"SharePoint Portal Server 2001 Planning and Installation Guide", http://www.microsoft.com/technet/prodtechnol/sppt/sharepoint/plan/planinst.mspx, printed on May 22, 2006, 86 pp.
Singhal, A. et al., "AT&T at TREC-9", Proceedings of the Ninth Text Retrieval Conference, NIST Special Publication 500-249, 'Online! 2001, pp. 103-105.
Smyth Barry,, "Relevance at a Distance—An Investigation of Distance-Biased Personalization on the Mobile Internet", no date, pp. 1-6.
Sturdy, Derek, "Squirrels and nuts: metadata and knowledge management", Business Information Review, 18(4), pp. 34-42, Dec. 2001.
Taylor et al., "Optimisation Methods for Ranking Functions with Multiple Parameters"—http://delivery.acm.org/10.1145/1190000/1183698/p585-taylor.pdf?key1=1183698&key2=36775338111&coll=GUIDE&dl=GUIDE&CFID=22810237&CFTOKEN=34449120, pp. 585-593.
Voorhees, E., "Overview of TREC 2002", Gaithersburg, Maryland, Nov. 19-22, 15 pp.
Web Page "Reuters: Reuters Corpus", http://about.reuter.com/researchandstandards/corpus/, viewed Mar. 18, 2004.
Wen, JI-Rong, "Query Clustering Using User Logs", Jan. 2002, pp. 59-81.
Westerveld, T. et al., "Retrieving Web pages using Content, Links, URLs and Anchors", Proceedings of the Tenth Text Retrieval Conference, NIST Special Publication, 'Online! Oct. 2001, pp. 1-10.
Wilkinson, R., "Effective Retrieval of Structured Documents", Annual ACM Conference on Research and Development, 1994, 7 pp.
Xue, Gui-Rong, et al., "Optimizing Web Search Using Web Click-Through Data," http://people.cs.vt.edu/~xwensi/Publication/p118-xue.pdf, CIKM'04, Nov. 8-13, 2004, 9 pages.
Yi, Jeonghe,e et al., "Metadata Based Web Mining for Topic-Specific Information Gathering", IEEE, pp. 359-368, 2000.

(56) References Cited

OTHER PUBLICATIONS

Yi, Jeonghee, et al., "Using Metadata to Enhance Web Information Gathering", D.Suciu and G. Vossen (eds.): WebDB 2000, LNCS 1997, pp. 38-57, 2001.
Yuwono, Budi and Lee, Dik L., "Search and Ranking Algorithms for Locating Resources on the World Wide Web", IEEE, 1996, pp. 164-170.
Zamir, O. et al., "Grouper: A Dynamic Clustering Interface to Web Search Results", Computer Networks (Amsterdam, Netherlands: 1999), 31(11-16): 1361-1374, 1999.
U.S. Appl. No. 10/609,315, filed Jun. 27, 2003, entitled "Normalizing Document Metadata Using Directory Services".
U.S. Appl. No. 09/493,748, filed Jan. 28, 2000 entitled "Adaptive Web Crawling Using a Statistical Model".
U.S. Appl. No. 11/874,844, filed Oct. 18, 2007 entitled "Enterprise Relevancy Ranking Using a Neural Network".
U.S. Appl. No. 11/874,579, filed Oct. 18, 2007 entitled "Ranking and Providing Search Results Based in Part on a Number of Click-Through Features".
Official Action in U.S. Appl. No. 10/609,315 mailed Dec. 15, 2005.
U.S. Official Action in U.S. Appl. No. 10/981,962 mailed Apr. 5, 2006.
Official Action in U.S. Appl. No. 10/609,315 mailed Jun. 1, 2006.
U.S. Official Action in U.S. Appl. No. 10/981,962 mailed Sep. 21, 2006.
U.S. Official Action in U.S. Appl. No. 10/804,326 mailed Oct. 16, 2006.
U.S. Official Action in U.S. Appl. No. 10/955,462 mailed Nov. 3, 2006.
U.S. Official Action in U.S. Appl. No. 10/955,983 mailed Mar. 22, 2007.
U.S. Official Action in U.S. Appl. No. 10/981,962 mailed Apr. 30, 2007.
U.S. Official Action in U.S. Appl. No. 10/955,462 mailed May 11, 2007.
U.S. Official Action in U.S. Appl. No. 11/019,091 mailed Jun. 20, 2007.
U.S. Official Action in U.S. Appl. No. 10/955,462 mailed Sep. 10, 2007.
U.S. Official Action in U.S. Appl. No. 11/073,381 mailed Sep. 18, 2007.
U.S. Official Action in U.S. Appl. No. 10/955,983 mailed Nov. 13, 2007.
U.S. Official Action in U.S. Appl. No. 10/804,326 mailed Dec. 11, 2007.
U.S. Official Action in U.S. Appl. No. 11/238,906 mailed Jan. 8, 2008.
U.S. Official Action in U.S. Appl. No. 10/981,962 mailed Mar. 17, 2008.
U.S. Official Action in U.S. Appl. No. 11/019,091 mailed Apr. 3, 2008.
U.S. Official Action in U.S. Appl. No. 11/412,723 mailed May 28, 2008.
U.S. Official Action in U.S. Appl. No. 11/073,381 mailed Jul. 10, 2008.
U.S. Official Action in U.S. Appl. No. 11/206,286 mailed Jul. 14, 2008.
U.S. Official Action in U.S. Appl. No. 11/238,906 mailed Sep. 16, 2008.
EP Search Report in EP 00309121 mailed Jul. 18, 2002.
EP Exam Report in EP 00309121.2-1522 mailed Jul. 4, 2003.
EP Exam Report in EP 00309121.2-1527 mailed Jun. 16, 2004.
EP Search Report in EP 05105048 mailed Jan. 17, 2006.
EP Search Report in EP 05105110 dated Aug. 11, 2006.
EP Exam Report in EP 00309121.2-1527 mailed Feb. 8, 2007.
EP Exam Report in EP 05105048.2-2201 mailed Apr. 23, 2007.
Chinese First Office Action in 200510088527.5 mailed Apr. 18, 2008.
Chinese First Office Action in 200510088213.5 mailed May 9, 2008.
Chinese Second Office Action in 200510088213.5 mailed Oct. 10, 2008.
PCT Search Report in PCT/US2006/031965 mailed Jan. 11, 2007.
US Official Non-Final Action mailed Nov. 13, 2009 in U.S. Appl. No. 11/874,844.
Chen, Michael et al., Cha Cha, "A System for Organizing Intranet Search Results", Computer Science Department, University of California, Berkeley, 1999, pp. 1-12.
U.S. Official Action in U.S. Appl. No. 10/804,326 mailed Jun. 7, 2007.
U.S. Official Action in U.S. Appl. No. 10/955,983 mailed Jul. 21, 2008.
U.S. Official Action in U.S. Appl. No. 10/804,326 mailed Dec. 10, 2008.
U.S. Official Action in U.S. Appl. No. 11/019,091 mailed Dec. 11, 2008.
U.S. Official Action in U.S. Appl. No. 10/955,983 mailed Dec. 18, 2008.
U.S. Official Action in U.S. Appl. No. 11/206,286 mailed Dec. 24, 2008.
Final Office Action in U.S. Appl. No. 11/874,579 mailed Jan. 14, 2011.
US Official Final Action mailed Dec. 18, 2009 in U.S. Appl. No. 11/238,906.
Japanese Final Rejection mailed Jan. 22, 2010 in JP Appln No. 2008/527094.
Conlon, M., "Inserts Made Simple", American Printer, Nov. 1, 2002, 4 pages.
International Search Report cited in European Patent Application No. 08 840 594.9 Jan. 21, 2011, 8 pages.
Supplemental International Search Report cited in European Patent Application No. 08 840 594.9 Feb. 8, 2011, 10 pages.
U.S. Official Action in U.S. Appl. No. 11/073,381 mailed Feb. 23, 2011, 30 pages.
US Official Final Action mailed Mar. 11, 2010 in U.S. Appl. No. 11/412,723.
Egyptian Official Action in PCT 269/2008 mailed Feb. 1, 2010.
U.S. Official Action in U.S. Appl. No. 11/073,381 mailed Apr. 12, 2010.
Second Office Action in Chinese Appln. No. 200680029645.1, dated Apr. 6, 2010.
Chinese Final Rejection mailed Mar. 6, 2009 in Chinese Application No. 200510088213.5.
U.S. Office Action mailed Apr. 15, 2009 in U.S. Appl. No. 11/073,381.
U.S. Office Action mailed May 19, 2009 in U.S. Appl. No. 11/238,906.
Chen, Hsinchun et al., "A Smart Itsy Bitsy Spider for the Web", Journal of the American Society for Information Science, 49(7), 1998, pp. 604-618.
Kleinberg, Jon M., "Authoritative Sources in a Hyperlinked Environment", Proceedings of the aCM-SIAM symposium on Discrete Algorithms, 1998, 34 pp.
U.S. Official Action in U.S. Appl. No. 10/955,983 mailed Jun. 10, 2009.
Agarwal et al., "Ranking Database Queries Using User Feedback: A Neural Network Approach", Fall 2006, 9 pp.
Non-Final Office Action in U.S. Appl. No. 11/874,579 mailed Jun. 22, 2010.
U.S. Appl. No. 12/828,508 entitled "System and Method for Ranking Search Results Using Click Distance" filed Jul. 1, 2010, 29 pages.
European Official Action in 05105110.0-1527, Aug. 4, 2010, 6 pages.
Chinese Decision on Rejection in 200680029645.1 mailed Aug. 12, 2010.
Russian Official Action in 2008105758 mailed Jun. 29, 2010.
U.S. Official Non-Final Action in U.S. Appl. No. 12/828,508 mailed Aug. 13, 2010.
Chinese First Official Action in 200680029645.1 mailed Jun. 19, 2009.
Chinese First Official Action in 200680035828.4 mailed Jun. 19, 2009.
Chinese Third Official Action in 200510088213.5 mailed Sep. 4, 2009.
Japanese Notice of Rejection in 2008-527094 mailed Sep. 11, 2009.

(56) References Cited

OTHER PUBLICATIONS

U.S. Official Action in U.S. Appl. No. 11/019,091 mailed Sep. 1, 2009.
U.S. Official Action in U.S. Appl. No. 11/412,723 mailed Sep. 3, 2009.
Non-Final Office Action in U.S. Appl. No. 11/073,831 mailed Sep. 13, 2010.
U.S. Official Action in U.S. Appl. No. 11/073,381 mailed Sep. 29, 2009.
Australian First Examiner's Report in 2006279520 mailed Oct. 5, 2010.
Japanese Notice of Rejection in 2005-175172 mailed Sep. 28, 2010.
Japanese Notice of Rejection in 2005-175173 mailed Oct. 1, 2010.
Kazama, K., "A Searching and Ranking Scheme Using Hyperlinks and Anchor Texts", IPSJ SIG Technical Report, vol. 2000, No. 71, Information Processing Society of Japan, Japan, Jul. 28, 2000, pp. 17-24.
Matsuo, Y., "A New Definition of Subjective Distance Between Web Pages," IPSJ Journal, vol. 44, No. 1, Information Processing Society of Japan, Japan, Jan. 15, 2003, pp. 88-94.
PCT Search Report in PCT/US2009/063333 dated Apr. 22, 2010.
Australian Exam Report in Application No. 2008 00521-7, mailed Mar. 11, 2009, 4 pgs.
Australian Notice of Allowance in Application 2006279520, mailed Mar. 2, 2011, 3 pgs.
Bohm et al., "Multidimensional Index Structures in Relational Databases", Journal of Intelligent Information Systems, Jul. 2000, vol. 15, Issue 1, pp. 1-20, found at: http://springerlink.com/content/n345270t27538741/fulltext.pdf.
Chinese Application 200510088213.5, Notice of Allowance mailed Apr. 20, 2010, 4 pgs.
Chinese Application No. 200510088212.0, First Office Action mailed Jul. 4, 2008, 10 pgs.
Chinese Application No. 200510088212.0, Notice of Allowance mailed Jan. 8, 2010, 4 pgs.
Chinese Final Rejection in 200510084707.6 mailed Aug. 21, 2009, 13 pgs.
Chinese First Office Action in 200510084707.6 mailed Mar. 28, 2008, 10 pgs.
Chinese First Office Action in 200680034531.6 mailed Sep. 11, 2009, 7 pgs.
Chinese First Office Action in Chinese Application/Patent No. 200880112416.5, mailed Aug. 12, 2011, 11 pgs.
Chinese Notice of Allowance in 200510088527.5 mailed Jul. 24, 2009, 4 pgs.
Chinese Notice of Allowance in 200680034531.6 mailed Oct. 14, 2010, 6 pgs.
Chinese Second Office Action in 200510084707.6 mailed Nov. 7, 2008, 10 pgs.
Chinese Third Office Action in 200510084707.6 mailed Feb. 20, 2009, 12 pgs.
Desmet, P. et al., "Estimation of Product Category Sales Responsiveness to Allocated Shelf Space", Intern. J. of Research in Marketing, vol. 15, No. 5, Dec. 9, 1998, pp. 443-457.
EP Second Office Action in Application 05105672.9, mailed Oct. 15, 2009, 4 pgs.
EP Examination Report in Application 05105672.9, mailed Oct. 24, 2006, 4 pgs.
EP Office Action in Application 05105107.6, mailed Mar. 28, 2008, 6 pgs.
EP Search Report in Application 05105107.6, mailed Apr. 7, 2006, 3 pgs.
EP Search Report in Application 05105672.9, mailed Feb. 6, 2006, 3 pgs.
European Notice of Allowance in Application 00309121.2, mailed Jun. 15, 2009, 5 pgs.
Fiedler, J. et al., Using the Web Efficiently: Mobile Crawlers, 17th Annual Int'l. Conference of the Association of Management on Computer Science, Aug. 1999, pp. 324-329.
Gross, Christian, Microsoft Interactive Developer, No. 2, "Integrating the Microsoft Index Server with Active Server Pages", Jun. 1997, 21 pgs.
Japanese Final Rejection in 2005-175172 mailed Jun. 7, 2011, 5 pgs.
Japanese Final Rejection in JP Application 2008-532469, mailed Jan. 29, 2010, 19 pgs.
Japanese Notice of Allowance in 2005-175173 mailed Jun. 7, 2011, 6 pgs.
Japanese Notice of Allowance in JP Application 2008-532469, mailed Feb. 22, 2011, 6 pgs.
Japanese Notice of Final Rejection in 2005-175174, mailed Aug. 5, 2011, 5 pgs.
Japanese Notice of Rejection in 2005-175174, mailed Oct. 29, 2010, 13 pgs.
Japanese Notice of Rejection in Application No. 2005-187816 mailed May 20, 2011, 13 pgs.
Japanese Office Action in JP Application 2008-532469, mailed Sep. 29, 2009, 18 pgs.
Mittal et al., "Framework for Synthesizing Semantic-Level Indices", Multimedia Tools and Applications, Jun. 2003, vol. 20, Issue 2., pp. 1-24, found online at: http://www.springerlink.com/content/tv632274r1267305/fulltext.pdf.
PCT International Search Report, Application No. PCT/US2006/037206, mailed Jan. 16, 2007, 10 pgs.
Philippines Office Action in 1-2008-500189 mailed Mar. 11, 2011, 1 page.
Philippines Official Action in 1-2008-500189 mailed Jun. 22, 2011, 1 page.
Philippines Official Action in 1-2008-500433 mailed Mar. 24, 2011, 1 page.
Russian Application No. 2008105758, Notice of Allowance mailed Dec. 16, 2010, 5 pgs.
Russian Notice of Allowance in Application No. 2008110731/08, mailed Oct. 25, 2010, 7 pgs.
South Africa Notice of Allowance in Application No. 2008/02250 mailed Jul. 23, 2009, 1 page.
U.S. Appl. No. 11/874,579, filed Oct. 18, 2007, Amendment and Response filed Nov. 22, 2010, 8 pgs.
U.S. Appl. No. 11/874,579, filed Oct. 18, 2007, Amendment and Response filed May 16, 2011, 14 pgs.
U.S. Appl. No. 12/828,508, Amendment and Response filed Jan. 13, 2011, 11 pgs.
U.S. Appl. No. 12/828,508, Notice of Allowance mailed Mar. 31, 2011, 9 pgs.
U.S. Appl. No. 12/828,508, Notice of Allowance mailed Jul. 6, 2011, 8 pgs.
U.S. Appl. No. 11/019,091, Amendment and Response filed Dec. 20, 2007, 23 pgs.
U.S. Appl. No. 11/019,091, Amendment and Response filed Oct. 3, 2008, 15 pgs.
U.S. Appl. No. 11/019,091, Amendment and Response filed Jun. 11, 2009, 12 pgs.
U.S. Appl. No. 11/019,091, Amendment and Response filed Nov. 30, 2009, 11 pgs.
U.S. Appl. No. 11/019,091, Notice of Allowance mailed Dec. 23, 2009, 16 pgs.
U.S. Appl. No. 11/073,381, Amendment and Response filed Mar. 18, 2008, 14 pgs.
U.S. Appl. No. 11/073,381, Amendment and Response filed Dec. 9, 2008, 11 pgs.
U.S. Appl. No. 11/073,381, Amendment and Response filed Jul. 15, 2009, 10 pgs.
U.S. Appl. No. 11/073,381, Amendment and Response filed Dec. 28, 2009, 9 pgs.
U.S. Appl. No. 11/073,381, Amendment and Response filed Jul. 9, 2010, 10 pgs.
U.S. Appl. No. 11/073,381, Amendment and Response filed Dec. 13, 2010, 10 pgs.
U.S. Appl. No. 10/804,326, Amendment and Response filed Mar. 16, 2007, 21 pgs.
U.S. Appl. No. 10/804,326, Amendment and Response filed Sep. 7, 2007, 26 pgs.

(56) References Cited

OTHER PUBLICATIONS

U.S. Appl. No. 10/804,326, Amendment and Response filed Feb. 11, 2008, 28 pgs.
U.S. Appl. No. 10/804,326, Advisory Action mailed Feb. 21, 2008, 3 pgs.
U.S. Appl. No. 10/804,326, Amendment and Response filed Jun. 10, 2008, 27 pgs.
U.S. Appl. No. 10/804,326, Amendment and Response filed Mar. 9, 2009, 8 pgs.
U.S. Appl. No. 10/804,326, Notice of Allowance mailed May 29, 2009, 8 pgs.
U.S. Appl. No. 10/609,315, Amendment and Response filed Mar. 17, 2006, 14 pgs.
U.S. Appl. No. 10/609,315, Amendment and Response filed Nov. 29, 2006, 23 pgs.
U.S. Appl. No. 10/609,315, Notice of Allowance mailed Jan. 24, 2007, 6 pgs.
U.S. Appl. No. 10/609,315, Notice of Allowance mailed May 30, 2007, 4 pgs.
U.S. Appl. No. 11/238,906, Amendment and Response filed Jun. 9, 2008, 10 pgs.
U.S. Appl. No. 11/238,906, Amendment and Response filed Feb. 26, 2009, 9 pgs.
U.S. Appl. No. 11/238,906, Amendment and Response filed Sep. 1, 2009, 9 pgs.
U.S. Appl. No. 11/238,906, Amendment and Response filed May 28, 2010, 9 pgs.
U.S. Appl. No. 11/238,906, Notice of Allowance mailed Jul. 22, 2010, 10 pgs.
U.S. Appl. No. 11/238,906, Notice of Allowance mailed Aug. 5, 2010, 4 pgs.
U.S. Appl. No. 11/412,723, Amendment and Response filed Nov. 26, 2008, 10 pgs.
U.S. Appl. No. 11/412,723, Amendment and Response filed Jun. 23, 2009, 11 pgs.
U.S. Appl. No. 11/412,723, Amendment and Response filed Nov. 30, 2009, 10 pgs.
U.S. Appl. No. 11/412,723, Amendment and Response filed May 31, 2010, 11 pgs.
U.S. Appl. No. 11/412,723, Notice of Allowance mailed Jul. 9, 2010, 10 pgs.
U.S. Appl. No. 11/874,844, Amendment and Response filed Mar. 15, 2010, 16 pgs.
U.S. Appl. No. 11/874,844, Notice of Allowance mailed May 18, 2010, 9 pgs.
U.S. Appl. No. 11/874,844, Notice of Allowance mailed Jun. 25, 2010, 2 pgs.
U.S. Appl. No. 09/493,748, Office Action mailed Sep. 25, 2003, 11 pgs.
U.S. Appl. No. 09/493,748, Amendment and Response filed Apr. 20, 2004, 16 pgs.
U.S. Appl. No. 09/493,748, Final Office Action mailed Jul. 20, 2004, 14 pgs.
U.S. Appl. No. 09/493,748, Amendment and Response filed Oct. 12, 2004, 18 pgs.
U.S. Appl. No. 09/493,748, Advisory Action mailed Jan. 4, 2005, 2 pgs.
U.S. Appl. No. 09/603,695, Office Action mailed Nov. 7, 2003, 11 pgs.
U.S. Appl. No. 09/603,695, Amendment and Response filed Feb. 27, 2004, 13 pgs.
U.S. Appl. No. 09/603,695, Final Office Action mailed May 18, 2004, 12 pgs.
U.S. Appl. No. 09/603,695, Amendment and Response filed Jul. 22, 2004, 13 pgs.
U.S. Appl. No. 09/603,695, Advisory Action mailed Aug. 27, 2004, 3 pgs.
U.S. Appl. No. 09/603,695, Amendment and Response filed Nov. 5, 2004, 9 pgs.
U.S. Appl. No. 09/603,695, Notice of Allowance mailed Dec. 21, 2004, 8 pgs.
U.S. Appl. No. 10/981,962, Amendment and Response filed Jun. 27, 2006, 23 pgs.
U.S. Appl. No. 10/981,962, Advisory Action mailed Jan. 23, 2007, 3 pgs.
U.S. Appl. No. 10/981,962, Amendment and Response filed Feb. 7, 2007, 1 pg.
U.S. Appl. No. 10/981,962, Amendment and Response filed Jul. 27, 2007, 16 pgs.
U.S. Appl. No. 10/981,962, Office Action mailed Nov. 13, 2007, 3 pgs.
U.S. Appl. No. 10/981,962, Amendment and Response filed Nov. 27, 2007, 10 pgs.
U.S. Appl. No. 10/981,962, Amendment and Response filed Aug. 18, 2008, 10 pgs.
U.S. Appl. No. 10/981,962, Notice of Allowance mailed Sep. 11, 2008, 14 pgs.
U.S. Appl. No. 10/981,962, Notice of Allowance mailed Oct. 15, 2008, 6 pgs.
U.S. Appl. No. 10/981,962, Notice of Allowance mailed Jan. 9, 2009, 6 pgs.
U.S. Appl. No. 10/981,962, Notice of Allowance mailed Jan. 29, 2009, 6 pgs.
U.S. Appl. No. 10/981,962, Notice of Allowance mailed May 8, 2009, 6 pgs.
U.S. Appl. No. 10/981,962, Notice of Allowance mailed Aug. 20, 2009, 6 pgs.
U.S. Appl. No. 11/022,054, Office Action mailed Jun. 19, 2007, 19 pgs.
U.S. Appl. No. 11/022,054, Amendment and Response filed Aug. 24, 2007, 19 pgs.
U.S. Appl. No. 11/022,054, Notice of Allowance mailed Nov. 15, 2007, 10 pgs.
U.S. Appl. No. 11/206,286, Amendment and Response filed Sep. 30, 2008, 11 pgs.
U.S. Appl. No. 11/206,286, Amendment and Response filed Mar. 24, 2009, 13 pgs.
U.S. Appl. No. 11/206,286, Notice of Allowance mailed Apr. 22, 2009, 9 pgs.
U.S. Appl. No. 11/206,286, Amendment and Response filed Jul. 22, 2009, 3 pgs.
U.S. Appl. No. 10/955,462 Amendment and Response filed Mar. 5, 2007, 18 pgs.
U.S. Appl. No. 10/955,462 Amendment and Response filed Aug. 8, 2007, 21 pgs.
U.S. Appl. No. 10/955,462 Amendment and Response filed Mar. 10, 2008, 17 pgs.
U.S. Appl. No. 10/955,462 Notice of Allowance mailed Jun. 17, 2008, 12 pgs.
U.S. Appl. No. 10/955,462 Notice of Allowance mailed Sep. 23, 2008, 6 pgs.
U.S. Appl. No. 10/955,462 Notice of Allowance mailed Feb. 24, 2009, 7 pgs.
U.S. Appl. No. 10/955,462 Notice of Allowance mailed Jun. 10, 2009, 6 pgs.
U.S. Appl. No. 10/955,462 Notice of Allowance mailed Oct. 16, 2009, 7 pgs.
U.S. Appl. No. 10/955,462 Notice of Allowance mailed Jan. 25, 2010, 6 pgs.
U.S. Appl. No. 10/955,983, Amendment and Response filed Aug. 22, 2007, 13 pgs.
U.S. Appl. No. 10/955,983, Amendment and Response filed May 13, 2008, 14 pgs.
U.S. Appl. No. 10/955,983, Amendment and Response filed Sep. 25, 2008, 13 pgs.
U.S. Appl. No. 10/955,983, Amendment and Response filed Mar. 18, 2009, 18 pgs.
U.S. Appl. No. 10/955,983, Amendment and Response filed Oct. 13, 2009, 12 pgs.
U.S. Appl. No. 10/955,983, Notice of Allowance mailed Jan. 12, 2010, 10 pgs.

(56) References Cited

OTHER PUBLICATIONS

U.S. Appl. No. 10/955,983, Notice of Allowance mailed Jun. 4, 2010, 5 pgs.
U.S. Appl. No. 10/951,123, Office Action mailed Jan. 25, 2007, 16 pgs.
U.S. Appl. No. 10/951,123, Amendment and Response filed Apr. 25, 2007, 15 pgs.
U.S. Appl. No. 10/951,123, Final Office Action mailed Jul. 13, 2007, 15 pgs.
U.S. Appl. No. 10/951,123, Amendment and Response filed Dec. 13, 2007, 10 pgs.
U.S. Appl. No. 10/951,123, Advisory Action mailed Dec. 31, 2007, 3 pgs.
U.S. Appl. No. 10/951,123, Amendment and Response filed Jan. 14, 2008, 10 pgs.
U.S. Appl. No. 10/951,123, Office Action mailed Mar. 18, 2008, 20 pgs.
U.S. Appl. No. 10/951,123, Amendment and Response filed Sep. 17, 2008, 15 pgs.
U.S. Appl. No. 10/951,123, Final Office Action mailed Jan. 5, 2009, 23 pgs.
U.S. Appl. No. 10/951,123, Amendment and Response filed Apr. 6, 2009, 18 pgs.
U.S. Appl. No. 10/951,123, Notice of Allowance mailed Jun. 25, 2009, 5 pgs.
U.S. Appl. No. 10/956,891, Office Action mailed Mar. 22, 2007, 15 pgs.
U.S. Appl. No. 10/956,891, Amendment and Response filed Aug. 22, 2007, 11 pgs.
U.S. Appl. No. 10/956,891, Final Office Action filed Nov. 1, 2007, 18 pgs.
U.S. Appl. No. 10/956,891, Amendment and Response filed Mar. 3, 2008, 11 pgs.
U.S. Appl. No. 10/956,891, Advisory Action mailed Mar. 21, 2008, 3 pgs.
U.S. Appl. No. 10/956,891, Amendment and Response filed May 1, 2008, 11 pgs.
U.S. Appl. No. 10/956,891, Office Action mailed Jul. 16, 2008, 19 pgs.
U.S. Appl. No. 10/956,891, Amendment and Response filed Oct. 16, 2008, 12 pgs.
U.S. Appl. No. 10/956,891, Final Office Action mailed Dec. 31, 2008, 16 pgs.
U.S. Appl. No. 10/956,891, Amendment and Response filed Jun. 1, 2009, 12 pgs.
U.S. Appl. No. 10/956,891, Notice of Allowance mailed Aug. 20, 2009, 7 pgs.
U.S. Appl. No. 11/231,955, filed Sep. 21, 2005, Office Action mailed Jan. 30, 2008, 8 pgs.
U.S. Appl. No. 11/231,955, filed Sep. 21, 2005, Amendment and Response filed Apr. 30, 2008, 12 pgs.
U.S. Appl. No. 11/231,955, filed Sep. 21, 2005, Final Office Action mailed Jun. 4, 2008, 8 pgs.
U.S. Appl. No. 11/231,955, filed Sep. 21, 2005, Amendment and Response filed Sep. 15, 2008, 16 pgs.
U.S. Appl. No. 11/231,955, filed Sep. 21, 2005, Notice of Allowance mailed Oct. 21, 2008, 5 pgs.
U.S. Appl. No. 12/359,939, filed Jan. 26, 2009, Office Action mailed Jan. 21, 2011, 15 pgs.
U.S. Appl. No. 12/359,939, filed Jan. 26, 2009, Amendment and Response filed May 23, 2011, 8 pgs.
Luxenburger et al., "Matching Task Profiles and User Needs in Personalized Web Search", CIKM Proceeding of the 17th ACM Conference on Information and Knowledge Mining, Oct. 2008, pp. 689-698.
Takeda, Takaharu et al., "Multi-Document Summarization by efficient text processing", *Proceedings of the FIT2007, Sixth Forum on Information Technology*, vol. 2, No. E-014, pp. 165-168, Information Processing Society of Japan, Japan, Aug. 22, 2007. (not an English document).
Utiyama, Masao et al., "Implementation of an IR package", *IPSJ SIG Notes*, vol. 2001, No. 74 (2001-FI-63-8), pp. 57-64, Information Processing Society of Japan, Japan, Jul. 25, 2001. (not an English document).
U.S. Appl. No. 12/359,939, Office Action mailed Jun. 17, 2013, 19 pgs.
PCT Search Report in Application PCT/US2013/022825, mailed Apr. 30, 2013, 11 pgs.
Japanese Notice of Rejection in Application 2011-194741, mailed May 14, 2013, 4 pgs.
Japanese Notice of Rejection in Application 2011-504031, mailed May 14, 2013, 4 pgs.
Canadian Office Action in Application 2618854, mailed Mar. 27, 2013, 2 pgs.
Chinese 2nd Office Action in Application 200980112928.6, mailed Mar. 4, 2013, 9 pgs.
European Report on Result of Consultation in Application EP 06836141.9, mailed Jan. 9, 2013, 3 pgs.
European Notice of Allowance in Application EP 06836141.9, mailed Jan. 31, 2013, 6 pgs.
Korean Notice of Preliminary Rejection in Application 10-2008-7007702, mailed Feb. 4, 2013, 4 pgs.
Korean Notice of Preliminary Rejection in Application 1020087006775, mailed Feb. 4, 2013, 1 pg.
Korean Notice of Preliminary Rejection in Application 10-2008-7003121, mailed Jan. 21, 2013, 11 pgs.
Malaysian Notice of Allowance in Application PI20063920, mailed Dec. 14, 2012, 2 pgs.
Russian Office Action in Application 2010141559, mailed Jan. 28, 2013, 6 pgs.
Taiwanese Notice of Allowance in Application 95129817, mailed Jan. 29, 2013, 4 pgs.
U.S. Appl. No. 12/569,028, Office Action mailed Apr. 2, 2013, 21 pgs.
U.S. Appl. No. 12/569,028, Amendment and Response filed Jan. 15, 2013, 14 pgs.
Chinese Decision on Reexamination cited in 200680029645.1, mailed Dec. 14, 2012, 15 pgs.
Russian Official Action in 2010141559, mailed Jan. 28, 2013, 4 pgs. (in foreign language—no English translation).
European Communication in Application 05105107.6, mailed Dec. 17, 2012, 4 pgs.
Japanese Notice of Allowance in Application 2011-021985, mailed Dec. 25, 2012, 6 pgs.
U.S. Appl. No. 12/359,939, filed Jan. 26, 2009, Amendment and Response filed Nov. 29, 2012, 9 pgs.
Taiwanese Search Report in Application 95129817, mailed Oct. 19, 2012, 1 pg.
U.S. Appl. No. 12/569,028, Office Action mailed Oct. 15, 2012, 14 pgs.
U.S. Appl. No. 12/359,939, filed Jan. 26, 2009, Amendment and Response filed Oct. 26, 2012, 11 pgs.
Chinese Notice of Allowance in Application 200510084707.6, mailed Sep. 25, 2012, 4 pgs.
Malaysia Adverse Search Report in Application PI20080638, mailed Jul. 31, 2012, 4 pgs.
Malaysia Adverse Report in Application PI20063920, mailed Jul. 31, 2012, 3 pgs.
European Extended Search Report in Application 097308084, mailed Oct. 2, 2012, 7 pgs.
U.S. Appl. No. 12/359,939, Office Action mailed Jul. 17, 2012, 21 pgs.
U.S. Appl. No. 12/569,028, Amendment and Response filed Jun. 27, 2012, 8 pgs.
U.S. Appl. No. 12/101,951, Amendment and Response filed Jun. 21, 2012, 8 pgs.
U.S. Appl. No. 12/101,951, Advisory Action mailed Jun. 27, 2012, 3 pgs.
Chinese 1st Office Action in Application 200980112928.6, mailed Jun. 8, 2012, 8 pgs.
Chinese Notice of Allowance in Application 200880112416.5, mailed Jul. 18, 2012, 4 pgs.

(56) References Cited

OTHER PUBLICATIONS

Chinese Notice of Reexamination in Application 200680029645.1, mailed Aug. 20, 2012, 11 pgs.
EP Communication to cancel the oral summons in Application 05105048.2, mailed Jul. 16, 2012, 1 pg.
EP Notice of Allowance in Application 05105048.2, mailed Aug. 13, 2012, 8 pgs.
EP Result of consultation in Application 05105048.2, mailed Aug. 8, 2012, 3 pgs.
Japanese Interrogation in Application 2005-175174, mailed Jul. 24, 2012, 7 pgs.
Mexican Office Action with Summary in PA/a/2008/02173 mailed Jun. 5, 2012, 7 pgs.
Malaysian Substantive Examination Report in Application PI 20063920, mailed Jul. 31, 2012, 3 pgs.
Chinese Decision on Re-Examination in Application 200510084707.6 mailed Aug. 22, 2011, 12 pgs.
European Search Report in Application 06789800.7 mailed Oct. 13, 2011, 11 pgs.
Indonesian Notice of Allowance in Application W00200800848 mailed Jun. 9, 2011, 4 pgs.
Japanese Appeal Decision in 2008-527094 (Appeal No. 2010-011037) mailed Nov. 4, 2011—31 pgs., only first page translated.
Korean Official Action in 2005-0057199 mailed Aug. 4, 2011, 4 pgs.
Page, L. et al., "The PageRank Citation Ranking: Bringing Order To The Web", Internet Citation, found online at: http://citeseer.nj.nec.com/page98pagerank.html, retrieved Sep. 16, 2002, 18 pgs.
U.S. Appl. No. 12/828,508, Amendment and Response filed Sep. 6, 2011, 3 pgs.
U.S. Appl. No. 12/569,028, Office Action mailed Sep. 28, 2011, 14 pgs.
U.S. Appl. No. 12/359,939, filed Jan. 26, 2009, Amendment and Response filed Jul. 21, 2011, 8 pgs.
U.S. Appl. No. 12/359,939, filed Jan. 26, 2009, Amendment and Response filed Sep. 28, 2011, 8 pgs.
U.S. Appl. No. 12/359,939, filed Jan. 26, 2009, Office Action mailed Dec. 6, 2011, 14 pgs.
Horikawa, Akira, "Table design correcting room of Access user", Visual Basic Magazine, vol. 6, No. 3, pp. 158-170, Shoeisha Col. Ltd., Japan, Mar. 1, 2000. (No English translation available).
Ding, Chen et al., "An Improved Usage-Based Ranking", obtained online Jul. 1, 2009 at: http://www.springerlink.com/content/h0jut6d1dnrk5227/fulltext.pdf, 8 pgs.
New Zealand Examination Report in Application No. 566532, mailed Oct. 15, 2009, 2 pgs.
European Extended Search Report in Application 06836141.9 mailed Dec. 27, 2011, 8 pgs.
Extended European Search Report in Application 06804098.9, mailed Dec. 19, 2011, 7 pgs.
Phillipines Letters Patent in Application 12008500189, issued Jan. 6, 2012, 2 pgs.
U.S. Appl. No. 12/569,028, Notice of Allowance mailed Feb. 21, 2014, 8 pgs.
U.S. Appl. No. 12/359,939, Amendment and Response filed Mar. 11, 2014, 10 pgs.
Australian Office Action in Application 2009234120, mailed Feb. 26, 2014, 3 pgs.
Japanese Notice of Allowance in Application 2011-504031, mailed Jan. 30, 2014, 4 pgs.
U.S. Appl. No. 12/101,951, Notice of Allowance mailed Dec. 16, 2013, 3 pgs.
U.S. Appl. No. 12/101,951, Petition and Response filed Dec. 16, 2013, 5 pgs.
Russian Notice of Allowance in Application 2011108842, mailed Dec. 16, 2013, 7 pgs. (English translation).
U.S. Appl. No. 12/791,756, Amendment and Response filed Dec. 24, 2103, 19 pgs.
U.S. Appl. No. 11/874,579, filed Oct. 18, 2007, Amendment and Response filed Dec. 10, 2013, 17 pgs.
U.S. Appl. No. 12/359,939, Office Action mailed Jan. 2, 2014, 18 pgs.

Canadian Notice of Allowance in Application 2618854, received Jan. 13, 2014, 1 pg.
Chinese Notice of Allowance in Application 2009801129286, mailed Aug. 30, 2013, 4 pgs.
U.S. Appl. No. 12/791,756, Notice of Allowance mailed Feb. 7, 2014, 10 pgs.
U.S. Appl. No. 12/569,028, Amendment and Response filed Jan. 28, 2014, 13 pgs.
Becker, Hila et al., "Learning Similarity Metrics for Event Identification in Social Media," Published Date: Feb. 4-6, 2010, http://infolab.stanford.edu/~mor/research/becker-wsdm10.pdf, 10 pgs.
Hoeber, Orland et al., "Evaluating the Effectiveness of Term Frequency Histograms for Supporting Interactive Web Search Tasks," Published Date: Feb. 25-27, 2008, http://delivery.acm.org/10.1145/1400000/1394484/p360-hoeber.pdf?key1=1394484&key2=1611170721&coll=GUIDE&dl=GUIDE&CFID=83362159&CFTOKEN=63982632, 9 pgs.
PCT International Search Report and Written Opinion in Application PCT/US2011/033125, mailed Dec. 15, 2011, 8 pgs.
Pera, Maria S. et al., "Using Word Similarity to Eradicate Junk Emails," Published Date: Nov. 6-8, 2007, http://delivery.acm.org/10.1145/1330000/1321581/p943-pera.pdf?key1=1321581&key2=8421170721&coll=GUIDE&dl=GUIDE&CFID=83362328&CFTOKEN=17563913, 4 pgs.
Svore, Krysta M. et al., "Improving Web Spam Classification using Rank-time Features," Published Date: May 8, 2007, http://www2007.org/workshops/paper_101.pdf, 8 pgs.
U.S. Appl. No. 12/101,951, Amendment filed Oct. 30, 2013, 8 pgs.
U.S. Appl. No. 12/791,756, Amendment and Response filed Apr. 30, 2012, 12 pgs.
U.S. Appl. No. 12/791,756, Amendment and Response filed Sep. 26, 2012, 14 pgs.
U.S. Appl. No. 12/791,756, Office Action mailed Jan. 31, 2012, 18 pgs.
U.S. Appl. No. 12/791,756, Office Action mailed Oct. 3, 2013, 32 pgs.
U.S. Appl. No. 12/791,756, Office Action mailed Jun. 26, 2012, 26 pgs.
U.S. Appl. No. 12/569,028, Office Action mailed Aug. 28, 2013, 21 pgs.
Craswell, Nick et al., "Relevance Weighting for Query Independent Evidence", Aug. 15-19, 2005, ACM, pp. 416-423.
Huuhka, "Google: Data Structures and Algorithms".
Song et al., "Exploring URL Hit Priors For Web Search", vol. 3936, Springer Berlin / Heidelberg, 2006.
U.S. Appl. No. 12/101,951, Office Action mailed Aug. 3, 2010, 26 pgs.
U.S. Appl. No. 12/101,951, Amendment and Response filed Dec. 3, 2010, 16 pgs.
U.S. Appl. No. 12/101,951, Office Action mailed Mar. 4, 2011, 25 pgs.
U.S. Appl. No. 12/101,951, Amendment and Response filed Jun. 3, 2011, 12 pgs.
U.S. Appl. No. 12/101,951, Office Action mailed Oct. 7, 2011, 28 pgs.
U.S. Appl. No. 12/101,951, Amendment and Response filed Jan. 9, 2012, 10 pgs.
U.S. Appl. No. 12/101,951, Office Action mailed Feb. 24, 2012, 28 pgs.
PCT International Search Report in PCT/US2009/036597 dated Aug. 28, 2009, 11 pgs.
U.S. Appl. No. 12/569,028, Amendment and Response filed Aug. 2, 2013, 17 pgs.
U.S. Appl. No. 12/101,951, Notice of Allowance mailed Jul. 30, 2013, 5 pgs.
Japanese Appeal Decision and Notice of Allowance in Application 2005-175174, mailed Jun. 18, 2013, 4 pgs.
Malaysian Notice of Allowance in Application PI 20080638, mailed Jun. 28, 2013, 2 pgs.
Russian Notice of Allowance in Application No. 2010141559, mailed Jun. 27, 2013, 6 pgs.

(56) References Cited

OTHER PUBLICATIONS

Murata, Shin Ya, et al., "Ranking Search Results based on Information Needs in Conjunction with Click-Log Analysis", Journal of Japan Database Society, Japan Database Society, Mar. 27, 2009, vol. 7, Part 4, pp. 37-42.
U.S. Appl. No. 11/874,579, Office Action mailed Sep. 10, 2013, 27 pgs.
U.S. Appl. No. 12/359,939, Office Action mailed Oct. 11, 2013, 11 pgs.
U.S. Appl. No. 12/101,951, Notice of Allowance mailed Sep. 5, 2013, 2 pgs.
U.S. Appl. No. 12/101,951, Notice of Allowance mailed Sep. 18, 2013, 2 pgs.
Japanese Notice of Rejection in Application 2011-527079, mailed Oct. 8, 2013, 15 pgs.
Japanese Notice of Allowance in Application 2011-194741, mailed Sep. 6, 2013, 4 pgs.
Japanese Notice of Rejection in Application 2011-266249, mailed Sep. 2, 2013, 7 pgs.
U.S. Appl. No. 12/101,951, Notice of Allowance mailed Mar. 26, 2014, 8 pgs.
U.S. Appl. No. 13/360,536, Office Action mailed Mar. 20, 2014, 14 pgs.
U.S. Appl. No. 11/874,579, Office Action mailed Mar. 28, 2014, 30 pgs.
U.S. Appl. No. 13/360,536, filed Jan. 27, 2012 entitled "Re-Ranking Search Results".
"Microsoft FAST Search Server 2010 for SharePoint, Evaluation Guide", Published on Aug. 12, 2010, Available at: http://www.microsoft.com/downloads/info.aspx?na=41&srcfamilyid=f1e3fb39-6959-4185-8b28-5315300b6e6b&srcdisplaylang=en&u=http%3a%2f%2download.microsoft.com%2fdownload%2fA%2f7 %2fF%2fA7F98D88-BC15-4F3C-8B71-D42A5ED79964%, 60 pgs.
U.S. Appl. No. 12/569,028, Office Action mailed Feb. 27, 2012, 11 pgs.
U.S. Appl. No. 12/569,028, Amendment and Response filed Dec. 28, 2011, 8 pgs.
U.S. Appl. No. 12/359,939, Amendment and Response filed Mar. 23, 2012, 11 pgs.
U.S. Appl. No. 09/749,005, Office Action mailed Oct. 28, 2002, 12 pgs.
U.S. Appl. No. 09/749,005, Amendment and Response filed Apr. 28, 2003, 12 pgs.
U.S. Appl. No. 09/749,005, Office Action mailed Jun. 12, 2003, 10 pgs.
U.S. Appl. No. 09/749,005, Amendment and Response filed Jun. 21, 2004, 14 pgs.
U.S. Appl. No. 09/749,005, Notice of Allowance mailed Aug. 30, 2004, 9 pgs.
U.S. Appl. No. 09/749,005, Notice of Allowance mailed Mar. 4, 2005, 4 pgs.
U.S. Appl. No. 09/749,005, Notice of Allowance mailed Apr. 7, 2005, 4 pgs.
U.S. Appl. No. 10/959,330, Office Action mailed Jun. 27, 2005, 10 pgs.
U.S. Appl. No. 10/959,330, Amendment and Response filed Sep. 14, 2005, 12 pgs.
U.S. Appl. No. 10/959,330, Office Action mailed Dec. 14, 2005, 6 pgs.
U.S. Appl. No. 10/959,330, Amendment and Response filed Jan. 6, 2006, 10 pgs.
U.S. Appl. No. 10/959,330, Notice of Allowance mailed Apr. 3, 2006, 6 pgs.
U.S. Appl. No. 10/968,716, Office Action mailed Mar. 15, 2007, 13 pgs.
U.S. Appl. No. 10/968,716, Amendment and Response filed Jun. 15, 2007, 13 pgs.
U.S. Appl. No. 10/968,716, Amendment and Response filed Aug. 13, 2007, 6 pgs.
U.S. Appl. No. 10/968,716, Office Action mailed Oct. 26, 2007, 14 pgs.
U.S. Appl. No. 10/968,716, Amendment and Response filed Jan. 25, 2008, 8 pgs.
U.S. Appl. No. 10/968,716, Notice of Allowance mailed Jun. 2, 2008, 8 pgs.
EP Summons to Attend Oral Proceedings in EP 05105048.2-2201 mailed Apr. 3, 2012.
Korean Official Action in 2005-0057199 mailed Mar. 26, 2012, 5 pgs.
Japanese Notice of Allowance in 2005-175172 mailed Mar. 6, 2012, 6 pgs.
Japanese Final Notice of Rejection in Application No. 2005-187816 mailed Mar. 16, 2012, 5 pgs.
Losee, Robert M. et al., "Measuring Search Engine Quality and Query Difficulty: Ranking with Target and Freestyle," http://ils.unc.edu/~losee/paril.pdf, Journal of the American Society for Information Science, Jul. 29, 1999, 20 pages.
Ljosland, Mildrid, "Evaluation of Web Search Engines and the Search for Better Ranking Algorithms," http://www.aitel.hist.no/~mildrid/dring/paper/SIGIR.html, SIGIR99 Workshop on Evaluation of Reb Retrieval, Aug. 19, 1999, 5 pages.
Shamsfard, Mehrnoush, et al., "ORank: An Ontology Based System for Ranking Documents," http://www.waset.org/ijcs/v1/v1-3-30.pdf, International Journal of Computer Science, vol. 1, No. 3, Apr. 10, 2006, pp. 225-231.
MSDN, "Understanding Ranking," http://msdn.microsoft.com/en-us/library/ms142524.aspx, Sep. 2007, 4 pages.
Microsoft SharePoint Portal Server 2001 White Paper, "Microsoft SharePoint Portal Server: Advanced Technologies for Information Search and Retrieval," http://download.microsoft.com/download/3/7/a/37a762d7-dbe6-4b51-a6ec-f6136f44fd65/SPS_Search.doc, Jun. 2002, 12 pages.
C. Burges, R. Ragno, Q. V. Le, "Learning To Rank With Nonsmooth Cost Functions," http://research.microsoft.com/~cburges/papers/lambdarank.pdf, Schölkopf, Platt and Hofmann (Ed.) Advances in Neural Information Processing Systems 19, Proceedings of the 2006 Conference, MIT Press, 2006, 8 pages.
U.S. Official Action in U.S. Appl. No. 11/412,723 mailed Mar. 6, 2009.
Chinese Second Official Action in 200510088527.5 mailed Dec. 26, 2008.
PCT Search Report in PCT/US2008/011894 mailed Feb. 27, 2009.
Japanese Final Rejection in Application 2011-266249, mailed Apr. 7, 2014, 4 pgs.
Japanese Final Notice of Reason for Rejection in Application 2011-527079, mailed May 15, 2014, 6 pgs.
Australian Lapsing Notice in Application 2009290574, mailed May 19, 2014, 1 page.
Australian Notice of Allowance in Application 2009234120, mailed May 8, 2014, 2 pgs.
U.S. Appl. No. 12/791,756, Amendment and Response after Allowance filed Apr. 4, 2014, 3 pgs.
U.S. Appl. No. 12/359,939, Office Action mailed Apr. 9, 2014, 18 pgs.
U.S. Appl. No. 12/101,951, Notice of Allowance mailed Apr. 25, 2014, 4 pgs.
U.S. Appl. No. 12/569,028, Notice of Allowance mailed Jun. 6, 2014, 5 pgs.
U.S. Appl. No. 12/359,939, Amendment and Response filed Jun. 27, 2014, 11 pgs.
U.S. Appl. No. 13/360,536, Amendment and Response filed Jun. 20, 2014, 13 pgs.
Israeli Office Action in Application 207830, mailed Dec. 22, 2013, 7 pgs.
U.S. Appl. No. 12/359,939, Supplemental Amendment and Response filed Jun. 30, 2014, 8 pgs.
U.S. Appl. No. 12/101,951, Notice of Allowance mailed Jul. 15, 2014, 4 pgs.
U.S. Appl. No. 12/359,939, Supplemental Amendment and Response filed Oct. 16, 2014, 9 pgs.
U.S. Appl. No. 13/360,536, Office Action mailed Sep. 23, 2014, 13 pgs.

(56) References Cited

OTHER PUBLICATIONS

U.S. Appl. No. 12/359,939, Office Action mailed Nov. 6, 2014, 17 pgs.
Indian Office Action in Application 1481/DEL/2005, mailed Sep. 30, 2014, 2 pgs.
Indian Office Action in Application 1479/DEL/2005, mailed Sep. 30, 2014, 2 pgs.
Indian Office Action in Application 1569/DEL/2005, mailed Sep. 12, 2014, 2 pgs.
Israeli Office Action in Application 210591, mailed Oct. 23, 2014, 6 pgs.
Taiwan Search Report in Application 98106721, received on Sep. 2, 2014, 7 pgs.
European Communication in Application 06789800.7, mailed Oct. 23, 2014, 9 pgs.
European Intention to Grant in Application 09730808.4, mailed Nov. 7, 2014, 7 pgs.
EP 00309121.2 Summon to attend oral proceedings pursuant to Rule 115(1) EPC mailed Mar. 11, 2009, 11 pgs.
EP 05105110.0, Office Action mailed Sep. 18, 2006, 2 pgs.
Korean Notice of Preliminary Rejection in Application 10-2005-005719, Aug. 29, 2011, 1 page.
Korean Notice of Preliminary Rejection in Application 10-2005-005719, Mar. 26, 2012, 3 pgs. (no English translation).
Korean Notice of Preliminary Rejection in Application 10-2005-0057859, Feb. 11, 2010, 7 pgs. (no English translation).
Korean Notice of Preliminary Rejection in Application 10-2005-0056700, Feb. 16, 2010, 5 pgs. (no English translation).
PCT International Search Report in Application PCT/US06/37571, mailed Mar. 16, 2007, 10 pgs.
Egyptian Official Action in PCT 269/2008 mailed Mar. 17, 2010, 2 pgs.
Korean Notice of Preliminary Rejection in Application 10-2008-7003121, Jan. 24, 2013, 1 pg.
US Restriction Requirement in U.S. Appl. No. 10/804,326 mailed Aug. 20, 2008, 5 pgs.
US Restriction Requirement in U.S. Appl. No. 11/231,955 mailed Oct. 23, 2007, 6 pgs.
US Restriction Requirement in U.S. Appl. No. 11/231,955 mailed Nov. 30, 2007, 6 pgs.
Australian Office Action in Application 2009290574, mailed Dec. 3, 2014, 3 pgs.
Chinese 1st Office Action in Application 201180027027.4, mailed Dec. 29, 2014, 11 pgs.
Korean Notice of Preliminary Rejection in Application 10-2010-7022177, mailed Dec. 23, 2014, 9 pgs.
Australian Notice of Allowance in Application 2009290574, mailed Jan. 16, 2015, 2 pgs.
Taiwanese Notice of Allowance in Application 98106721, mailed Jan. 30, 2015, 4 pgs.
U.S. Appl. No. 13/360,536, Amendment and Response filed Jan. 23, 2015, 13 pgs.
U.S. Appl. No. 12/359,939, Amendment and Response filed Feb. 12, 2015, 13 pgs.
U.S. Appl. No. 13/360,536, Office Action mailed Feb. 26, 2015, 13 pgs.
U.S. Appl. No. 13/360,536, Amendment and Response filed May 26, 2015, 14 pgs.
U.S. Appl. No. 13/360,536, Office Action mailed Jun. 4, 2015, 13 pgs.
U.S. Appl. No. 12/359,939, Office Action mailed Aug. 4, 2015, 24 pgs.
U.S. Appl. No. 13/360,536, Amendment and Response filed Sep. 4, 2015, 15 pgs.
Gross, Christian, "This is Site Server! Integrating The Microsoft Index Server with Active Server Pages", printed in Microsoft Interactive Developer, Jul. 1997, No. 2, published by ASCII Corporation, Japan, on Jul. 18, 1997, pp. 75-90. (no English translation).
Chinese Notice of Allowance in Application 201180027027.4, mailed Aug. 27, 2015, 4 pgs.
Korean Office Action in Application 10-2011-7005588, mailed Oct. 15, 2015, 9 pgs.
European Summons to Attend Oral Proceedings in Application 05105672.9, mailed Nov. 6, 2015, 7 pgs.
European Summons to Attend Oral Proceedings in Application 05105672.9, mailed Nov. 30, 2015, 1 page.
Indian Office Action in Application 2260/DELNP/2008, mailed Sep. 22, 2015, 3 pgs.
U.S. Appl. No. 13/360,536, Office Action mailed Nov. 17, 2015, 12 pgs.
Indian Office Action in Application 1484/DEL/2005, mailed Oct. 5, 2015, 2 pgs.
International Preliminary Report on Patentability Issued in PCT Application No. PCT/US2009/63333, Mailed Date: Mar. 15, 2011, 4 Pages.
U.S. Appl. No. 12/359,939, Appeal Brief filed Feb. 16, 2016, 33 pgs. pgs.
European Summons to attend oral proceedings in Application 05105672.9, mailed Dec. 21, 2015, 1 page.
European Brief Communication in Application 05105672.9, mailed Dec. 21, 2015, 1 page.
Indian Hearing Notice on Application 2260/DELNP/2008, mailed Jan. 29, 2016, 2 pgs.
U.S. Appl. No. 13/360,536, Amendment and Response filed Mar. 17, 2016, 8 pgs.
European extended Search Report in Application 09813811.8, mailed Mar. 3, 2016, 8 pgs.
Agichtein, Eugene et al., "Improving web search ranking by incorporating user behavior information", Proceedings of the Twenty-Ninth Annual International ACM SIGIR Conference on Research and Development in Information Retrieval ACM New York, NY, USA, vol. 29, Aug. 6, 2006, pp. 19-26.
Lewandowski, Dirk, "Web searching, search engines and information retrieval", Information Services & Use, 2005, pp. 137-147, Retrieved from the Internet: URL:http://citeseerx.ist.psu.edu/viewdoc/download?doi=.10.1.1.301.3944&rep=rep1&type=pdf, retrieved Feb. 23, 2016.
Israel Office Action in Application 210591, mailed Feb. 23, 2016, 8 pgs.

\* cited by examiner

DOCUMENT LENGTH AS A STATIC RELEVANCE FEATURE FOR RANKING SEARCH RESULTS

RELATED APPLICATIONS

This application is a continuation-in-part of U.S. patent application Ser. No. 11/874,579, filed Oct. 18, 2007, and entitled, "RANKING AND PROVIDING SEARCH RESULTS BASED IN PART ON A NUMBER OF CLICK-THROUGH FEATURES," which is related to U.S. patent application Ser. No. 11/874,844, filed Oct. 18, 2007, now issued U.S. Pat. No. 7,840,569, and entitled, "ENTERPRISE RELEVANCY RANKING USING A NEURAL NETWORK," both documents hereby incorporated by reference in their entirety.

BACKGROUND

Computer users have different ways to locate information that may be locally or remotely stored. For example, search engines can be used to locate documents and other files using keywords. Search engines can also be used to perform web-based queries. A search engine attempts to return relevant results based on a query.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are configured to provide information including using one or more ranking features when providing search results. In an embodiment, a system includes a search engine that includes a ranking algorithm that can be configured to use one or more ranking features to rank and provide search results based on a query. According to one embodiment, document length may be used as a ranking feature or measure of document relevance.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments are configured to provide information including using one or more ranking features when providing search results. In an embodiment, a system includes a search engine that includes a ranking algorithm that can be configured to use one or more click-through ranking features to rank and provide search results based on a query. In one embodiment, a system includes a ranking component that can use a click parameter, a skip parameter, one or more stream parameters and document length to rank and provide a search result.

In one embodiment, a system includes a search component which comprises a searching application that can be included as part of a computer-readable storage medium. The searching application can be used to provide search results based in part on a user query and other user action and/or inaction. For example, a user can input keywords to the search application and the search application can use the keywords to return relevant search results. The user may or may not click on a search result for more information. As described below, the search application can use prior action and prior inaction based information when ranking and returning search results. Correspondingly, the search application can use user interactions based on a search result to provide additional focus when returning relevant search results. For example, the search application can use click-through information when ranking search results and returning the ranked search results based on a user query.

Figure 1:
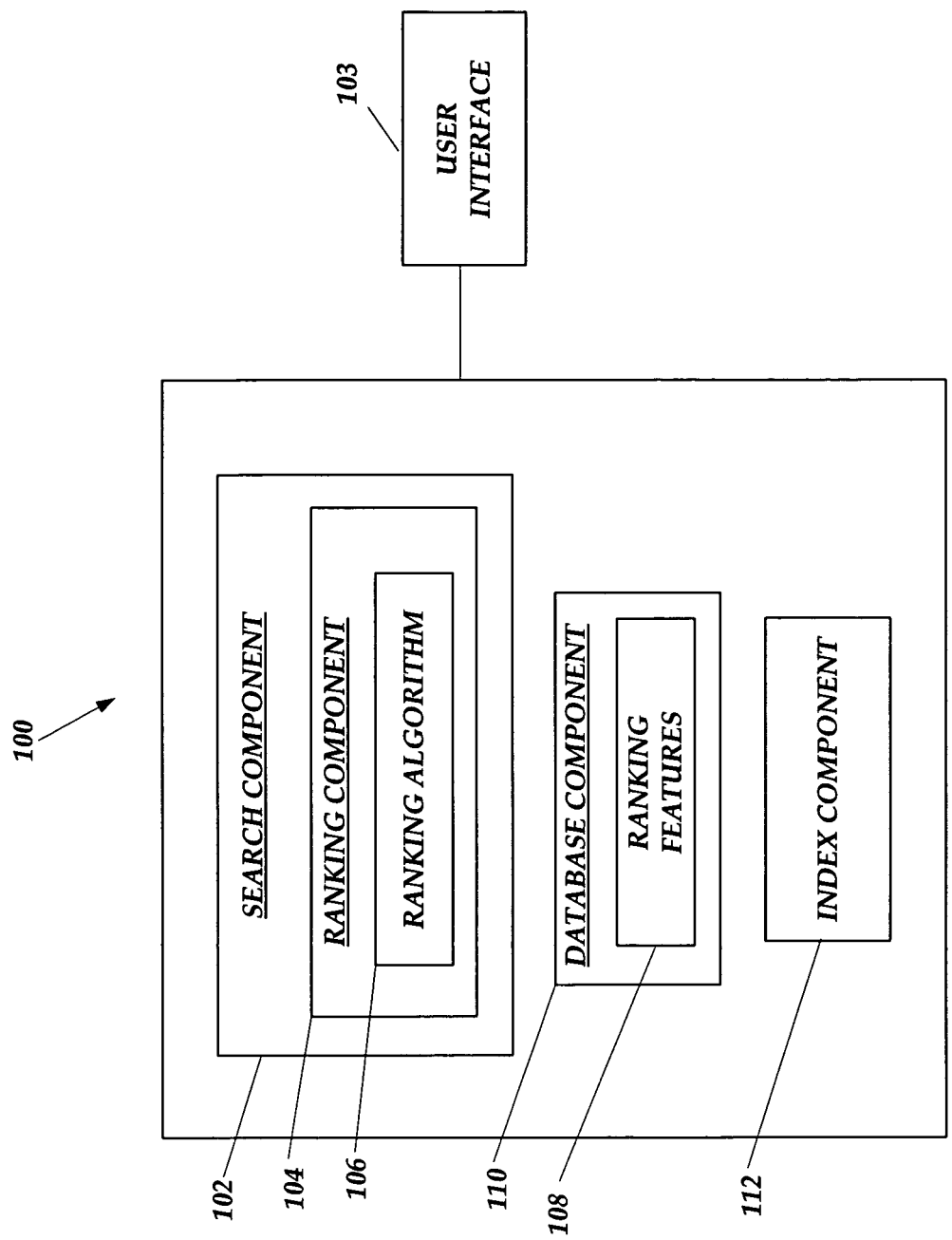
FIG. 1 depicts a block diagram of an example system configured to manage information.

FIG. 1 is a block diagram of a system 100 which includes indexing, searching, and other functionality. For example, the system 100 can include indexing, searching, and other applications that can be used to index information as part of an indexed data structure and search for relevant data using the indexed data structure. As described below, components of the system 100 can be used to rank and return search results based at least in part on a query. For example, components of the system 100 can be configured to provide web-based search engine functionality that can be used to return search results to a user browser, based in part on a submitted query which may consist of one or more keywords, phrases, and other search items. A user can submit queries to the search component 102 using a user interface 103, such as a browser or search window for example.

As shown in FIG. 1, the system 100 includes a search component 102, such as a search engine for example, that can be configured to return results based in part on a query input. For example, the search component 102 can operate to use a word, words, phrases, concepts, and other data to locate relevant files, documents, web pages, and other information. The search component 102 can operate to locate information and can be used by an operating system (OS), file system, web-based system, or other system. The search component 102 can also be included as an add-in component, wherein the searching functionality can be used by a host system or application.

The search component 102 can be configured to provide search results (uniform resource locaters (URLs) for example) that may be associated with files, such as documents for example, file content, virtual content, web-based content, and other information. For example, the search component 102 may use text, property information, and/or metadata when returning search results associated with local files, remotely networked files, combinations of local and remote files, etc. In one embodiment, the search component 102 can interact with a file system, virtual web, network, or other information source when providing search results.

The search component 102 includes a ranking component 104 that can be configured to rank search results based at least in part on a ranking algorithm 106 and one or more ranking features 108. In one embodiment, the ranking algorithm 106 can be configured to provide a number or other variable that can be used for sorting purposes by the search component 102. The ranking features 108 can be described as basic inputs or raw numbers that can be used when identifying relevance of a search result. The ranking features 108 can be collected, stored, and maintained in a database component 110.

For example, the click-through ranking features can be stored and maintained using a number of query logging tables which can also contain query information associated with user queries. In an alternative embodiment, the ranking features 108 can be stored and maintained in a dedicated store, including local, remote, and other storage mediums. One or more of the ranking features 108 can be input to the ranking algorithm 106, and the ranking algorithm 106 can operate to rank search results as part of a ranking determination. As described below, in one embodiment, the ranking component 104 can manipulate one or more ranking features 108 as part of the ranking determination.

Correspondingly, the search component 102 can use the ranking component 104 and associated ranking algorithm 106 when using one or more of the ranking features 108 as part of a ranking determination to provide search results. Search results can be provided based on a relevance ranking or some other ranking. For example, the search component 102 can render the search results from most relevant to least relevant based at least in part on the relevance determination providing by the ranking component 104 using one or more of the ranking features 108.

With continuing reference to FIG. 1, the system 100 also includes an index component 112 that can be used to index information. The index component 112 can be used to index and catalog information to be stored in the database component 110. Moreover, the index component 102 can use the metadata, content, and/or other information when indexing against a number of disparate information sources. For example, the index component 112 can be used to build an inverted index data structure that maps keywords to documents, including URLs associated with documents.

The search component 102 can use the indexed information when returning relevant search results according to the ranking provided by the ranking component 104. In an embodiment, as part of a search, the search component 102 can be configured to identify a set of candidate results, such as a number of candidate documents for example, that contain a portion or all of a user's query information, such as keywords and phrases for example. For example, query information may be located in a document's body or metadata, or additional metadata associated with a document that can be stored in other documents or data stores (such as anchor text for example). As described below, rather than returning an entire set of search results if the set is large, the search component 102 can use the ranking component 104 to rank the candidates with respect to relevance or some other criteria, and return a subset of the entire set based at least in part on the ranking determination. However, if the set of candidates is not too large, the search component 102 can operate to return the entire set.

In an embodiment, the ranking component 104 can use the ranking algorithm 106 to predict a degree of relevance of a candidate associated with a particular query. For example, the ranking algorithm 106 can calculate a rank value associated with a candidate search result, wherein a higher rank value corresponds with a more relevant candidate. Multiple features, including one or more ranking features 108, can be input into the ranking algorithm 106 which can then compute an output that enables the search component 102 to sort candidates by a rank or some other criteria. The search component 102 can use the ranking algorithm 106 to prevent the user from having to inspect an entire set of candidates, such as large volume internet candidates and enterprise URL collections for example, by limiting a set of candidates according to rank.

In one embodiment, the search component 102 can monitor and collect action-based and/or inaction-based ranking features. The action-based and inaction-based ranking features can be stored in the database component 110 and updated as necessary. For example, click-through information, can be monitored and stored in the database component 110 as one or more ranking features 108 when a user interacts with, such as by clicking, a search result. The information can also be used to track when a user does not interact with a search result. For example, a user may skip over and not click on one or more search results. In an alternative embodiment, a separate component, such as an input detector or other recording component for example, can be used to monitor user interactions associated with a search result or results.

The search component 102 can use a select number of the collected action-based and inaction-based ranking features as part of a relevance determination when returning search results. In one embodiment, the search component 102 can collect and use a number of click-based interaction parameters as part of a relevance determination when returning search results based on a query. For example, assume that a user clicks on a search result (e.g., a document) that was not returned at the top of the results for whatever reason. As described below, the search component 102 can record and use the click feature to boost the rank of the clicked result the next time some user issues the same or a similar query. The search component 102 can also collect and use other interactive features and/or parameters, such as a touch input, pen input, and other affirmative user inputs.

In one embodiment, the search component 102 can use one or more click-through ranking features, wherein the one or more click-through ranking features can be derived from implicit user feedback. The click-through ranking features can be collected and stored, including updated features, in a number of query logging tables of the database component 110. For example, the search component 102 can use the functionality of an integrated server platform, such as MICROSOFT OFFICE SHAREPOINT SERVER® system, to collect, store, and update interaction-based features that can be used as part of a ranking determination. The functionality of the server platform can include web content management, enterprise content services, enterprise search, shared business processes, business intelligence services, and other services.

According to this embodiment, the search component 102 can use one or more click-through ranking features as part of a ranking determination when returning search results. The search component 102 can use prior click-through information when compiling the click-through ranking features which it can use to bias ranking orderings as part of a relevance determination. As described below, the one or more click-through ranking features can be used to provide a self-tunable ranking functionality by utilizing the implicit feedback a search result receives when a user interacts or does not interact with the search result. For example, a number of search results may be provided by the search component 102 listed by relevance on a search result page, and parameters can be collected based on whether the user clicks on a search result or skips a search result.

The search component 102 can use information in the database component 110, including stored action and/or inaction based features, when ranking and providing search results. The search component 102 can use query records and information associated with prior user actions or inactions associated with a query result when providing a current list of relevant results to a requestor. For example, the search component 102 can use information associated with how other users have responded to prior search results (e.g., files, documents, feeds, etc.) in response to the same or similar queries when providing a current list of references based on an issued user query.

In one embodiment, the search component 102 can be used in conjunction with the functionality of a serving system, such as the MICROSOFT OFFICE SHAREPOINT SERVER® system, operating to record and use queries and/or query strings, record and use user actions and/or inactions associated with search results, and to record and use other information associated with a relevance determination. For example, the search component 102 can be used in conjunction with the functionality of the MICROSOFT OFFICE SHAREPOINT SERVER® system, to record and use issued queries along with a search result URL that may have been clicked for a particular query. The MICROSOFT OFFICE SHAREPOINT SERVER® system can also record a list of URLs that were shown or presented with a clicked URL, such as a number of URLs that were shown above a clicked URL for example. Additionally, the MICROSOFT OFFICE SHAREPOINT SERVER® system can operate to record a search result URL that was not clicked based on a particular query. The click-through ranking features can be aggregated and used when making a relevance determination, described below.

In one embodiment, a number of click-through ranking features can be aggregated and defined as follows:

1) a click parameter, Nc, which corresponds with a number of times (across all queries) that a search result (e.g., a document, file, URL, etc.) was clicked.

2) a skip parameter, Ns, which corresponds with a number of times (across all queries) that a search result was skipped. That is, the search result was included with other search results, may have been observed by a user, but not clicked. For example, an observed or skipped search result may refer to a search result having a higher rank than a clicked result. In one embodiment, the search component 102 can use an assumption that a user scans search results from top to bottom when interacting with search results.

3) a first stream parameter, Pc, which can be represented as a text stream corresponding to a union of all query strings associated with a clicked search result. In one embodiment, the union includes all query strings for which a result was returned and clicked. Duplicates of the query strings are possible (i.e., every individual query can be used in the union operation).

4) a second stream parameter, Ps, which can be represented as a text stream corresponding to a union of all query strings associated with a skipped search result. In one embodiment, the union includes all query strings for which a result was returned and skipped. Duplicates of the query strings are possible (i.e., every individual query can be used in the union operation).

The above-listed click-through ranking features can be collected at a desired time, such as by one or more crawling systems on some periodic basis for example, and associated with each search result. For example, one or more of the click-through ranking features can be associated with a document which was returned by the search component 102 based on a user query. Thereafter, one or more of the click-through ranking features can be input to the ranking component 104 and used with the ranking algorithm 106 as part of the ranking and relevance determination. In some cases, some search results (e.g., documents, URLs, etc.) may not include click-through information. For search results with missing click-through information, certain text properties (e.g., Pc and/or Ps streams) may be left empty and certain static parameters (e.g., Nc and Ns) may have zero values.

In one embodiment, one or more of the click-through ranking features can be used with the ranking algorithm 106 which first requires collecting one or more click-through aggregates during a crawl, including full and/or incremental crawls. For example, the search component 102 can employ a crawler which can operate to crawl a file system, web-based collection, or other repository when collecting information associated with click-through ranking features and other data. One or more crawlers can be implemented for a crawl or crawls depending on the crawl target or targets and particular implementation.

The search component 102 can use the collected information, including any click-through ranking features, to update query independent stores, such as a number of query logging tables for example, with one or more features that can be used when ranking search results. For example, the search component 102 can update a number of query logging tables with the click (Nc) parameter and/or the skip (Ns) parameter for each search result that includes updated click-through information. Information associated with the updated query independent stores can be also used by various components, including the index component 102 when performing indexing operations.

Accordingly, the index component 112 can periodically obtain any changes or updates from one or more independent stores. Moreover, the index component 112 can periodically update one or more indexes which can include one or more dynamic and other features. In one embodiment, the system 100 can include two indexes, a main index and a secondary index for example, that the search component 102 can use to serve a query. The first (main) index can be used to index keywords from document bodies and/or metadata associated with web sites, file servers, and other information repositories. The secondary index can be used to index additional textual and static features that may not be directly obtained from a document. For example, additional textual and static features may include anchor text, click distance, click data, etc.

The secondary index also allows for separate update schedules. For example, when a new document is clicked, to index the associated data only requires partially rebuilding the secondary index. Thus, the main index can remain unchanged and the entire document does not require re-crawling. The main index structure can be structures as an inverted index and can be used to map keywords to document IDs, but is not so limited. For example, the index component 112 can update a secondary index using the first stream parameter Pc and/or the second stream parameter Ps for each search result that includes updated click-through information. Thereafter, one or more of the click-through ranking features and associated parameters can be applied and used by the search component 102, such as one or more inputs to the ranking algorithm 106 as part of a relevance determination associated with a query execution.

As described below, a two layer neural network can be used as part of a relevance determination. In one embodiment, the implementation of the two layer neural network includes a training phase and a ranking phase as part of a forward propagation process using the two layer neural network. A lambda ranking model can be used as a training algorithm (see C. Burges, R. Ragno, Q. V. Le, "Learning To Rank With Nonsmooth Cost Functions" in Schölkopf, Platt and Hofmann (Ed.) Advances in Neural Information Processing Systems 19, Proceedings of the 2006 Conference, (MIT Press, 2006) during the training phase, and a neural net forward propagation model can be used as part of the ranking determination. For example, a standard neural net forward propagation model can be used as part of the ranking phase. One or more of the click-through ranking features can be used in conjunction with the two layer neural network as part of a relevance determination when returning query results based on a user query.

In an embodiment, the ranking component 104 utilizes a ranking algorithm 106 which comprises a two layer neural network scoring function, hereinafter "scoring function," which includes:

$$\text{Score}(x_1, \ldots, x_n) = \left( \sum_{j=1}^{m} h_j \cdot w2_j \right) \quad (1)$$

wherein, $$h_j = \tanh\left( \left( \sum_{i=1}^{n} x_i \cdot w_{ij} \right) + t_j \right) \quad (1a)$$

wherein, $h_j$ is an output of hidden node j, $x_i$ is an input value from input node i, such as one or more ranking feature inputs, $w2_j$ is a weight to be applied to a hidden node output, $w_{ij}$ is a weight to be applied to input value $x_i$ by hidden node j, $t_j$ is the threshold value for hidden node j, and, tan h is the hyperbolic tangent function:

$$h_j = \tanh\left( \left( \sum_{i=1}^{n} x_i \cdot w_{ij} \right) + t_j \right) \quad (1c)$$

In an alternative embodiment, other functions having similar properties and characteristics as the tan h function can be used above. In one embodiment, the variable $x_i$ can represent one or more click-through parameters. A λ-rank training algorithm can be used to train the two layer neural network scoring function before ranking as part of a relevance determination. Moreover, new features and parameters can be added to the scoring function without significantly affecting a training accuracy or training speed.

One or more ranking features 108 can be input and used by the ranking algorithm 106, the two layer neural network scoring function for this embodiment, when making a relevance determination when returning search results based on a user query. In one embodiment, one or more click-through ranking parameters (Nc, Ns, Pc, and/or Ps can be input and used by the ranking algorithm 106 when making a relevance determination as part of returning search results based on a user query.

The Nc parameter can be used to produce an additional input to the two layer neural net scoring function. In one embodiment, the input value associated with the Nc parameter can be calculated according to the following formula:

$$\text{input} = x_{iN_c} = \frac{\left( \frac{N_c}{K_{Nc} + N_c} - M_{Nc} \right)}{S_{Nc}} \quad (2)$$

wherein, in one embodiment, the Nc parameter corresponds with a raw parameter value associated with a number of times (across all queries and all users) that a search result was clicked.

$K_{Nc}$ is a tunable parameter (e.g., greater than or equal to zero).

$M_{Nc}$ and $S_{Nc}$ are mean and standard deviation parameters or normalization constants associated with training data, and, $iN_c$ corresponds with an index of an input mode.

The Ns parameter can be used to produce an additional input to the two layer neural net scoring function. In one embodiment, the input value associated with the Ns parameter can be calculated according to the following formula:

$$\text{input} = x_{iN_s} = \frac{\left( \frac{N_s}{K_{Ns} + N_s} - M_{Ns} \right)}{S_{Ns}} \quad (3)$$

wherein, in one embodiment, the Ns parameter corresponds with a raw parameter value associated with a number of times (across all queries and all users) that a search result was skipped.

$K_{Ns}$ is a tunable parameter (e.g., greater than or equal to zero), $M_{Ns}$ and $S_{Ns}$ are mean and standard deviation parameters or normalization constants associated with training data, and, $iN_s$ corresponds with an index of an input node.

The Pc parameter can be incorporated into the formula (4) below which can be used to produce a content dependent input to the two layer neural net scoring function.

$$\begin{aligned} \text{input} &= x_{iBM25_{main}} \quad (4) \\ &= BM25G_{main}(Q, D) \\ &= \frac{\left( \left( \sum_{t \in Q} \frac{TF'_t}{k'_1 + TF'_t} \cdot \log\left(\frac{N}{n_t}\right) \right) - M \right)}{S} \end{aligned}$$

The formula for $TF'_t$ can be calculated as follows:

$$TF'_t = \quad (5)$$

$$\left( \sum_{p \in D \backslash Pc} TF_{t,p} \cdot w_p \cdot \frac{1 + b_p}{\left( \frac{DL_p}{AVDL_p} + b_p \right)} \right) + TF_{t,Pc} \cdot w_{Pc} \cdot \frac{1 + b_{pc}}{\left( \frac{DL_{Pc}}{AVDL_{Pc}} + b_{Pc} \right)}$$

wherein,

Q is a query string, t is an individual query term (e.g., word),

D is a result (e.g., document) being scored, p is an individual property of a result (e.g., document) (for example, title, body, anchor text, author, etc. and any other textual property to be used for ranking, N is a total number of results (e.g., documents) in a search domain, $n_t$ is a number of results (e.g., documents) containing term t, $DL_p$ is a length of the property p, $AVDL_p$ is an average length of the property p, $TF_{t,p}$ is a term t frequency in the property p, $TF_{t,pc}$ corresponds to a number of times that a given term appears in the parameter Pc, $DL_{pc}$ corresponds with a length of the parameter Pc (e.g., the number of terms included), $AVDL_{pc}$ corresponds with an average length of the parameter Pc, $w_{pc}$ and $b_{pc}$ correspond with tunable parameters, D\Pc corresponds with a set of properties of a document D excluding property $P_c$ (item for $P_c$ is taken outside of the sum sign only for clarity), iBM25main is an index of an input node, and, M and S represent mean and standard deviation normalization constants.

The Ps parameter can be incorporated into the formula (6) below which can be used to produce an additional input to the two layer neural net scoring function.

$$\text{input} = x_{iP_s} \qquad (6)$$
$$= BM25G_{secondary}(Q, D)$$
$$= \frac{\left(\left(\sum_{t \in Q} \frac{TF_t''}{k_1'' + TF_t''} \cdot \log\left(\frac{N}{n_t}\right)\right) - M\right)}{S}$$

where, $$TF_t'' = TF_{t,ps} \cdot w_{ps} \cdot \frac{1 + b_{ps}}{\left(\frac{DL_{ps}}{AVDL_{ps}} + b_{ps}\right)} \qquad (7)$$

and, $TF_{t,ps}$ represent a number of times that a given term is associated with the Ps parameter, $DL_{ps}$ represents a length of the Ps parameter (e.g., a number of terms), $AVDL_{ps}$ represents an average length of the Ps parameter, N represents a number of search results (e.g., documents) in a corpus, $n_t$ represents a number of search results (e.g., documents) containing a given query term, $k'_s$, $w_{P_s}$, $b_{P_s}$ represent tunable parameters, and, M and S represent mean and standard deviation normalization constants.

Once one or more of the inputs have been calculated as shown above, one or more of the inputs can be input into (1), and a score or ranking can be output which can then be used when ranking search results as part of the relevance determination. As an example, $x_1$ can be used to represent the calculated input associated with the Nc parameter, $x_2$ can be used to represent the calculated input associated with the Ns parameter, $x_3$ can be used to represent the calculated input associated with the Pc parameter, and, $x_4$ can be used to represent the calculated input associated with the Ps parameter. As described above, streams can also include body, title, author, URL, anchor text, generated title, and/or Pc. Accordingly, one or more inputs, e.g., $x_1$, $x_2$, $x_3$, and/or $x_4$ can be input into the scoring function (1) when ranking search results as part of the relevance determination. Correspondingly, the search component 102 can provide ranked search results to a user based on an issued query and one or more ranking inputs. For example, the search component 102 can return a set of URLs, wherein URLs within the set can be presented to the user based on a ranking order (e.g., high relevance value to low relevance value).

Other features can also be used when ranking and providing search results. In an embodiment, click distance (CD), URL depth (UD), file type or type prior (T), language or language prior (L), and/or other ranking features can be used to rank and provide search results. One or more of the additional ranking features can be used as part of a linear ranking determination, neural net determination, or other ranking determination. For example, one or more static ranking features can be used in conjunction with one or more dynamic ranking features as part of a linear ranking determination, neural net determination, or other ranking determination.

Accordingly, CD represents click distance, wherein CD can be described as a query-independent ranking feature that measures a number of "clicks" required to reach a given target, such as a page or document for example, from a reference location. CD takes advantage of a hierarchical structure of a system which may follow a tree structure, with a root node (e.g., the homepage) and subsequent branches extending to other nodes from that root. Viewing the tree as a graph, CD may be represented as the shortest path between the root, as reference location, and the given page. UD represents URL depth, wherein UD can be used to represent a count of the number of slashes ("/") in a URL. T represents type prior, and, L represents language prior.

The T and L features can be used to represent enumerated data types. Examples of such a data type include file type and language type. As an example, for any given search domain, there may be a finite set of file types present and/or supported by the associated search engine. For example an enterprise intranet may contain word processing documents, spreadsheets, HTML web pages, and other documents. Each of these file types may have a different impact on the relevance of the associated document. An exemplary transformation can convert a file type value into a set of binary flags, one for each supported file type. Each of these flags can be used by a neural network individually so that each may be given a separate weight and processed separately. Language (in which the document is written) can be handled in a similar manner, with a single discrete binary flag used to indicate whether or not a document is written in a certain language. The sum of the term frequencies may also include body, title, author, anchor text, URL display name, extracted title, etc.

Ultimately, user satisfaction is one of surest measures of the operation of the search component 102. A user would prefer that the search component 102 quickly return the most relevant results, so that the user is not required to invest much time investigating a resulting set of candidates. For example, a metric evaluation can be used to determine a level of user satisfaction. In one embodiment, a metric evaluation can be improved by varying inputs to the ranking algorithm 106 or aspects of the ranking algorithm 106. A metric evaluation can be computed over some representative or random set of queries. For example, a representative set of queries can be selected based on a random sampling of queries contained in query logs stored in the database component 110. Relevance labels can be assigned to or associated with each result returned by the search component 102 for each of the metric evaluation queries.

For example, a metric evaluation may comprise an average count of relevant documents in the query at top N (1, 5, 10, etc.) results (also referred to as precision @ 1, 5, 10, etc.). As another example, a more complicated measure can be used to evaluate search results, such as an average precision or Normalized Discounted Cumulative Gain (NDCG). The NDCG can be described as a cumulative metric that allows multi-level judgments and penalizes the search component 102 for returning less relevant documents higher in the rank, and more relevant documents lower in the rank. A metric can be averaged over a query set to determine an overall accuracy quantification.

Continuing the NDCG example, for a given query "$Q_i$," the NDCG can be computed as:

$$M_q \sum_{j=1}^{N} (2^{r(f)} - 1)/\log(1+f) \qquad (8)$$

where N is typically 3 or 10. The metric can be averaged over a query set to determine an overall accuracy number.

Below are some experimental results obtained based on using the Nc, Ns, and Pc click-through parameters with the scoring function (1). Experiments were conducted on 10-splits query set (744 queries, ~130K documents), 5-fold cross-validation run. For each fold, 6 splits were used for training, 2 for validation, and 2 for testing. A standard version of a λ-rank algorithm was used (see above).

Accordingly, aggregated results using 2-layer neural net scoring function with 4 hidden nodes resulted in the following as shown in Table 1 below:

TABLE 1

| Set of features | NDCG@1 | NDCG@3 | NDCG@10 |
| --- | --- | --- | --- |
| Baseline (no click-through features) | 62.841 | 60.646 | 62.452 |
| Incorporated $N_c$, $N_s$ and $P_c$ | 64.598 (+2.8%) | 62.237 (+2.6%) | 63.164 (+1.1%) |

The aggregated results using 2-layer neural net scoring function with 6 hidden nodes resulted in the following as shown in Table 2 below:

TABLE 2

| Set of features | NDCG@1 | NDCG@3 | NDCG@10 |
| --- | --- | --- | --- |
| Baseline (no click-through) | 62.661 | 60.899 | 62.373 |
| Incorporated $N_c$, $N_s$ and $P_c$ | 65.447 (+4.4%) | 62.515 (+2.7%) | 63.296 (+1.5%) |

One additional ranking feature 108 that can be used as a measure of document relevance is document length. Document length may be an effective ranking tool because short documents typically do not include enough information to be useful for a user. That is, short documents typically do not provide an answer to a search query. On the other hand, large documents typically include so much information that is sometimes difficult to determine what information in the document is related to the search query.

Since many different types of documents may be returned as a result of a search query, a first step in determining document rank is to compute a normalized value of document length. This is done to make document length independent of the type of documents that are ranked. The normalized length of a document is defined as being equal to the length of a document, in words, divided by the average length of the set of documents being ranked, for example the documents returned as a result of a search query. This can be represented by the following equation:

$$D = L_D/L_{AVG} \qquad (9)$$

, where D represents the normalized document length, $L_D$ represent the length of the document being ranked, and $L_{AVG}$ represents the average length of documents in a set of documents.

A transform function is then used to provide a ranking value, from zero to one, for the normalized document length, a higher ranking value representing a more relevant document. In one embodiment, the transform function can be represented as follows:

$$F(D)=D, D<=1 \qquad (10)$$

$$F(D)=0.5+(3-D)/4, 1<D<=3 \qquad (11)$$

$$F(D)=2/(D+1), D>3 \qquad (12)$$

This example transform function penalizes documents for being too long or too short. The highest ranking value of one is computed for a document of average length, i.e, for a document having a normalized length of one. By contrast, a document with a normalized length of 0.5 (i.e half the average length) has a ranking value of 0.5 and a document with a normalized length of seven (i.e seven times the average length) has a ranking value of 0.25.

The document length ranking values can be stored in the database component 110 and updated as necessary. The search component 102 can use the document length information in the database component 110 when ranking and providing search results.

Figure 2:
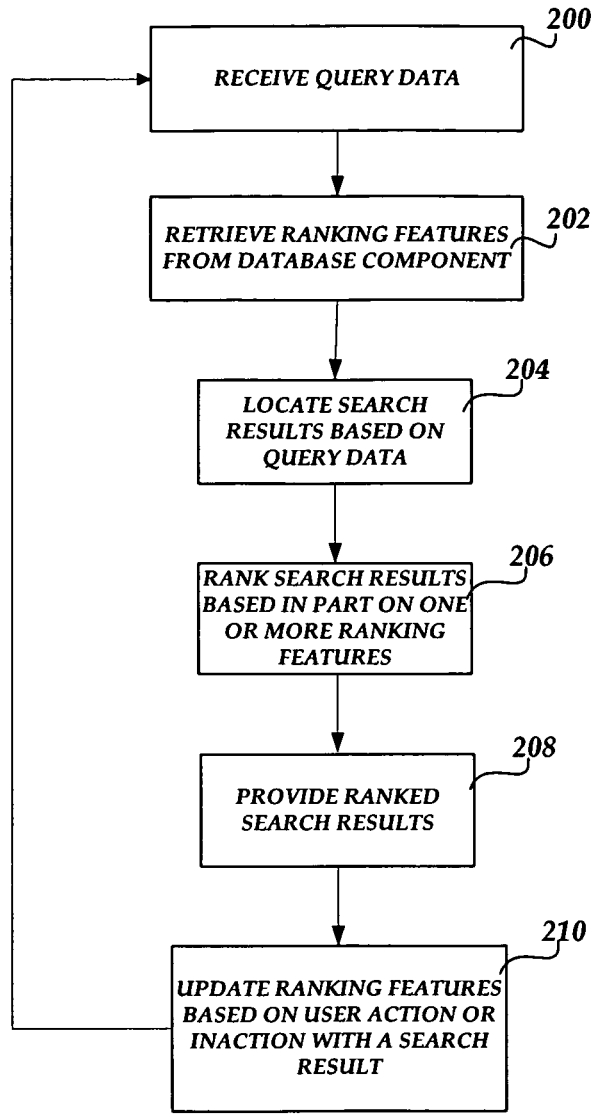
FIG. 2 is a flow diagram depicting an example of a ranking and query process.

FIG. 2 is a flow diagram illustrating a process of providing information based in part on a user query, in accordance with an embodiment. Components of FIG. 1 are used in the description of FIG. 2, but the embodiment is not so limited. At 200, the search component 102 receives query data associated with a user query. For example, a user using a web-based browser can submit a text string consisting of a number of keywords which defines the user query. At 202, the search component 102 can communicate with the database component 110 to retrieve any ranking features 108 associated with the user query. For example, the search component 102 can retrieve one or more click-through ranking features from a number of query tables, wherein the one or more click-through ranking features are associated with previously issued queries having similar or identical keywords.

At 204, the search component 102 can use the user query to locate one or more search results. For example, the search component 102 can use a text string to locate documents, files, and other data structures associated with a file system, database, web-based collection, or some other information repository. At 206, the search component 102 uses one or more of the ranking features 108 to rank the search results. For example, the search component 102 can input one or more click-through ranking parameters to the scoring function (1) which can provide an output associated with a ranking for each search result.

At 208, the search component 102 can use the rankings to provide the search results to a user in a ranked order. For example, the search component 102 can provide a number of retrieved documents to a user, wherein the retrieved documents can be presented to the user according to a numerical ranking order (e.g., a descending order, ascending order, etc.). At 210, the search component 102 can use a user action or inaction associated with a search result to update one or more ranking features 108 which may be stored in the database component 110. For example, if a user clicked or skipped a URL search result, the search component 102 can push the click-through data (click data or skip data) to a number of query logging tables of the database component 110. Thereafter, the index component 112 can operate to use the updated ranking features for various indexing operations, including indexing operations associated with updating an indexed catalog of information.

Figure 3:
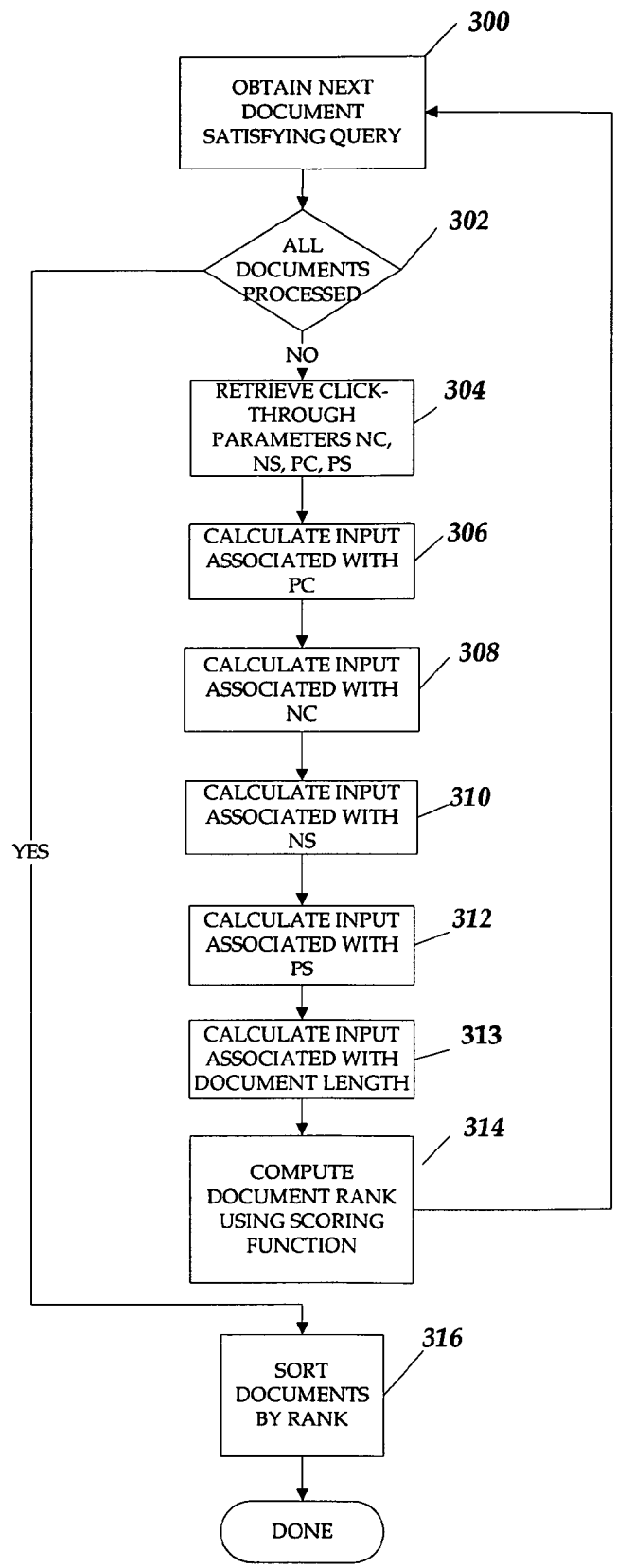
FIG. 3 is a flow diagram depicting an example of a ranking and query process.

FIG. 3 is a flow diagram illustrating a process of providing information based in part on a user query, in accordance with an embodiment. Again, components of FIG. 1 are used in the description of FIG. 3, but the embodiment is not so limited. The process of FIG. 3 is subsequent to the search component 102 receiving a user query issued from the user interface 103, wherein the search component 102 has located a number of documents which satisfy the user query. For example, the search component 102 can use a number of submitted keywords to locate documents as part of a web-based search.

At 300, the search component 102 obtains a next document which satisfied the user query. If all documents have been located by the search component 102 at 302, the flow proceeds to 316, wherein the search component 102 can sort the located documents according to rank. If all documents have not been located at 302, the flow proceeds to 304 and the search component 102 retrieves any click-through features from the database component 110, wherein the retrieved click-through features are associated with the current document located by the search component 102.

At 306, the search component 102 can compute an input associated with the Pc parameter for use by the scoring function (1) as part of a ranking determination. For example, the search component 102 can input the Pc parameter into the formula (4) to compute an input associated with the Pc parameter. At 308, the search component 102 can compute a second input associated with the Nc parameter for use by the scoring function (1) as part of a ranking determination. For example, the search component 102 can input the Nc parameter into the formula (2) to compute an input associated with the Nc parameter.

At 310, the search component 102 can compute a third input associated with the Ns parameter for use by the scoring function (1) as part of a ranking determination. For example, the search component 102 can input the Ns parameter into the formula (3) to compute an input associated with the Ns parameter. At 312, the search component 102 can compute a fourth input associated with the Ps parameter for use by the scoring function (1) as part of a ranking determination. For example, the search component 102 can input the Ps parameter into the formula (6) to compute an input associated with the Ps parameter.

At 313, the search component 102 can compute a fifth input associated with document length for use by the scoring function (1) as part of a ranking determination. For example, the search component 102 can compute the number of words in each document obtained as a result of the user query, the number of words in each document being representative of the length of that document. The normalized length of each document can be obtained using the formula (9) by dividing the length of each document by the average length of all documents obtained as a result of the query. A ranking value based on document length can then be obtained using the transform function defined by the formulas (10), (11) and (12) to compute a ranking value having a range between zero and one.

At 314, the search component 102 operates to input one or more of the calculated inputs into the scoring function (1) to compute a rank for the current document. In alternative embodiments, the search component 102 may instead calculate input values associated with select parameters, rather than calculating inputs for each click-through parameter. If there are no remaining documents to rank, at 316 the search component 102 sorts the documents by rank. For example, the search component 102 may sort the documents according to a descending rank order, starting with a document having a highest rank value and ending with a document having a lowest rank value. The search component 102 can also use the ranking as a cutoff to limit the number of results presented to the user. For example, the search component 102 may only present documents having a rank greater than X, when providing search results. Thereafter, the search component 102 can provide the sorted documents to a user for further action or inaction. While a certain order is described with respect to FIGS. 2 and 3, the order can be changed according to a desired implementation.

The embodiments and examples described herein are not intended to be limiting and other embodiments are available. Moreover, the components described above can be implemented as part of networked, distributed, or other computer-implemented environment. The components can communicate via a wired, wireless, and/or a combination of communication networks. A number of client computing devices, including desktop computers, laptops, handhelds, or other smart devices can interact with and/or be included as part of the system 100.

In alternative embodiments, the various components can be combined and/or configured according to a desired implementation. For example, the index component 112 can be included with the search component 102 as a single component for providing indexing and searching functionality. As additional example, neural networks can be implemented either in hardware or software. While certain embodiments include software implementations, they are not so limited and they encompass hardware, or mixed hardware/software solutions. Other embodiments and configurations are available.

Exemplary Operating Environment

Figure 4:
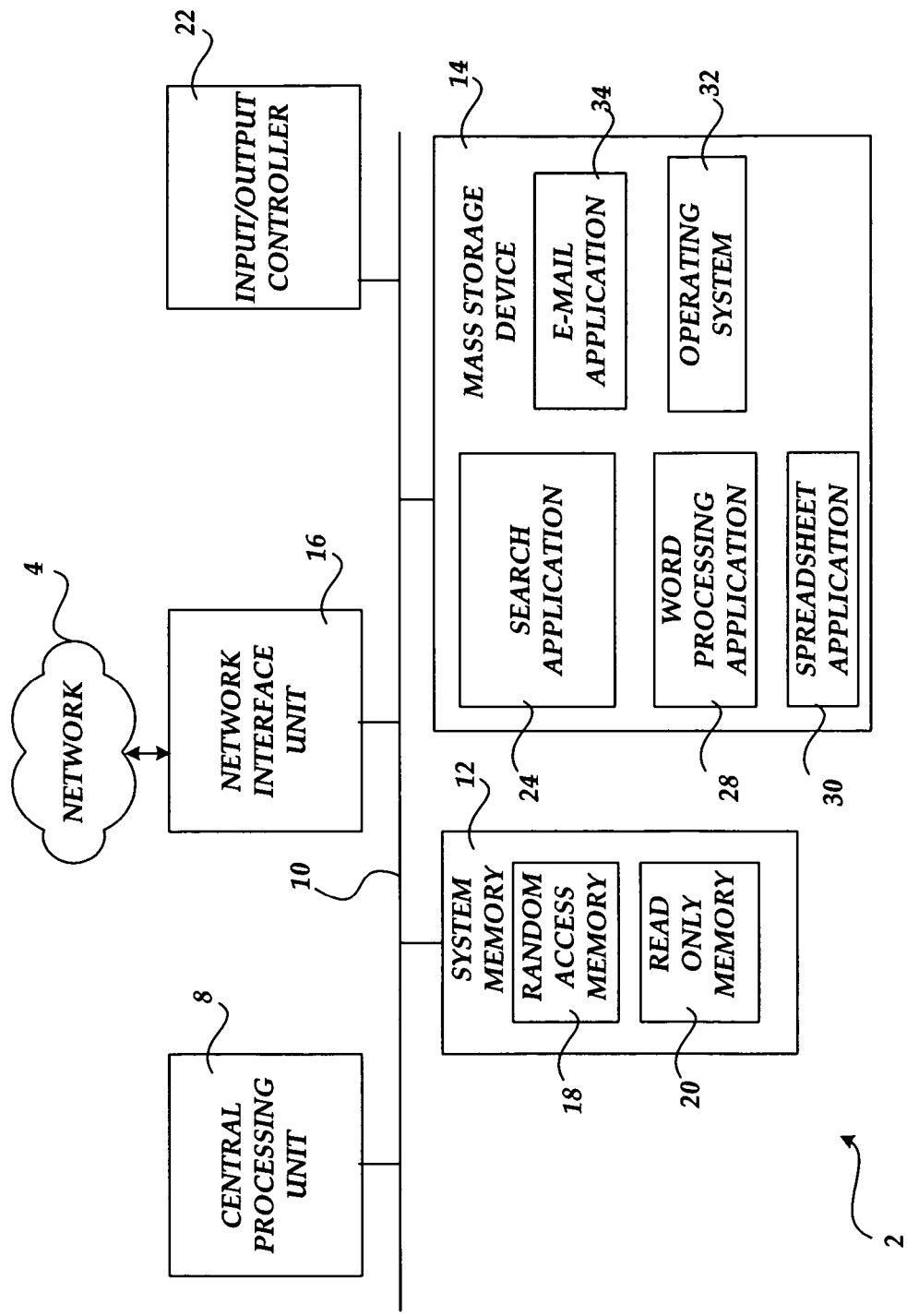
FIG. 4 is a block diagram illustrating a computing environment for implementation of various embodiments described herein.

Referring now to FIG. 4, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 4, an illustrative operating environment for embodiments of the invention will be described. As shown in FIG. 4, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a search application 24, word processing application 28, a spreadsheet application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A system for providing information comprising:
   one or more processors;
   one or more computer storage media storing computer executable instructions that when executed by the one or more processors provide:
   a search component configured to locate a search result based on a query input;
   a database component configured to store information associated with the query input including one or more ranking features, wherein the one or more ranking features are associated with a user action or user inaction associated with the search result which are collected with respect to the search result for a same query or a similar query previously received, and wherein one ranking feature of the one or more ranking features is associated with a normalized document length wherein the normalized document length is determined by dividing a length of a document to be ranked by an average length of a set of documents included in the search result, wherein the document to be ranked is included in the set of documents, wherein the length of the document corresponds to a number of words in the document; and
   a ranking component configured to rank the search result based, at least in part, on a ranking function and the one or more ranking features, including an action-based feature, an inaction-based feature and a normalized document length feature, wherein the search component uses the rank of the search result when providing search results according to a ranking order.

2. The system of claim 1, wherein a transform function converts the normalized document length into a ranking value between zero and one.

3. The system of claim 2, wherein the transform function is defined as:

$$F(D)=D, D<=1$$

$$F(D)=0.5+(3-D)/4, 1<B<=3$$

$$F(D)=2/(D+1), D>3,$$

wherein, D represents the normalized document length and F(D) represents the ranking value.

4. The system of claim 1, wherein the ranking component uses one or more click-through parameters when ranking the search result, wherein the one or more click-through parameters further comprise one or more of the following:
   a click parameter associated with a number of times that the search result has been clicked;

a skip parameter associated with a number of times that the search result has been skipped;

a first stream parameter corresponding to a union of query strings associated with a clicked search result; and a second stream parameter corresponding to a union of query strings associated with a skipped search result.

5. The system of claim 4, wherein the search component is further configured to update the one or more click-through parameters including using information associated with how the search result was interacted with when updating the one or more of the click-through parameters.

6. The system of claim 5, wherein the search component is further configured to update the one or more click-through parameters, wherein the update of the one or more click-through parameters corresponds with a selected search result or a skipped search result.

7. The system of claim 1, wherein the wherein the one or more ranking features comprise one or more dynamic ranking features selected from a group consisting of body, title, author, generated title, an anchor text, and a URL, and one or more static ranking features selected from a group consisting of click distance, URL depth, file type, and language.

8. A non-transitory computer-readable storage medium storing computer executable instructions that when executed by one or more processors provide a search engine configured to:

receive information associated with a query;

locate a search result associated with the query, wherein the search result includes one or more documents;

calculate a first input associated with a click parameter and the search result;

calculate a second input associated with a skip parameter and the search result;

calculate a third input associated with a normalized document length of the one or more documents included in the search result, wherein the normalized document length of the one or more documents is obtained by dividing a length of each document of the one or more documents by an average length of each document of the one or more documents included in the search result, wherein the length of the document corresponds to a number of words in the document; wherein the length of the document corresponds to a number of words in the document;

store information associated with the query including one or more ranking features, wherein the one or more ranking features are associated with a user action or user inaction associated with the search result which are collected with respect to the search result for a same query or a similar query previously received, and wherein one ranking feature of the one or more ranking features is associated with a normalized document length, wherein the document to be ranked is included in the one or more documents;

ranking the search result based on a ranking determination using the ranking features, the first input, the second input, and the third input;

and provide the search result according to the ranking determination.

9. The non-transitory computer-readable storage medium of claim 8, further configured to calculate a fourth input associated with a first stream parameter and the search result;

calculate a fifth input associated with a second stream parameter and the search result; and rank the one or more documents included in the search result using at least four of the first input, the second input, the third input, the fourth input, and the fifth input.

10. The non-transitory computer-readable storage medium of claim 8, further configured to update a store with click parameter and skip parameter updates associated with received interactions with the one or more documents included in the search result.

11. The non-transitory computer-readable storage medium of claim 8, further configured to update a store with stream parameter updates associated with received interactions with the one or more documents included in the search result.

12. A method of providing information comprising:

searching to locate a search result based on a query input;

storing information associated with the query input including one or more ranking features, wherein the one or more ranking features are associated with a user action or user inaction associated with the search result which are collected with respect to the search result for a same query or a similar query previously received, and wherein one ranking feature of the one or more ranking features is associated with a normalized document length wherein the normalized document length is determined by dividing a length of a document to be ranked by an average length of a set of documents included in the search result, wherein the document to be ranked is included in the set of documents, wherein the length of the document corresponds to a number of words in the document; and ranking the search result based, at least in part, on a ranking function and the one or more ranking features, including an action-based feature, an inaction-based feature and a normalized document length feature, wherein the search component uses the rank of the search result when providing search results according to a ranking order.

13. The method of claim 12, further comprising:

determining a fourth input value associated with a text stream and a received selection of at least one of the one or more query candidates; and ranking the one or more query candidates based in part on a scoring determination using a scoring function and one or more of the first input value, the second input value, the third input value and the fourth input value.

14. The method of claim 12, further comprising ranking the one or more query candidates according to a numerical order.

15. The system of claim 1, wherein the normalized document length is determined independently from a file type of one or more documents included in the search result.

16. The non-transitory computer-readable storage medium of claim 8, wherein the normalized document length of the one or more documents included in the search result is determined independently from a file type of the one or more documents included in the search result.

17. The non-transitory computer-readable storage medium of claim 8, wherein the normalized document length of the one or more documents is obtained by dividing a length of each document of the one or more documents by an average length of each document of the one or more documents included in the search result.

18. The method of claim 12, wherein the normalized document length of the at least one of the query candidates is determined independently from a file type of the at least one of the query candidates.

19. The method of claim 12, wherein the normalized document length of the at least one of the query candidates is obtained by dividing a length of the at least one of the query candidates by an average length of the one or more query candidates included in a result of the query.

* * * * *